(12) United States Patent
Magazine et al.

(10) Patent No.: US 11,349,904 B2
(45) Date of Patent: May 31, 2022

(54) SELECTING A MODE OF DELIVERY TO PROVIDE ACCESS TO A FILE SYSTEMS AND METHODS

(71) Applicant: Citrix Systems, Inc., Fort Lauderdale, FL (US)

(72) Inventors: Anuj Magazine, Bengaluru (IN); Praveen Raja Dhanabalan, Bengaluru (IN); Anudeep Athlur, Bengaluru (IN)

(73) Assignee: Citrix Systems, Inc., Fort Lauderdale, FL (US)

( * ) Notice: Subject to any disclaimer, the term of this patent is extended or adjusted under 35 U.S.C. 154(b) by 45 days.

(21) Appl. No.: 16/374,303

(22) Filed: Apr. 3, 2019

(65) Prior Publication Data

US 2020/0322415 A1    Oct. 8, 2020

(51) Int. Cl.
*G06F 15/16* (2006.01)
*H04L 67/06* (2022.01)
(Continued)

(52) U.S. Cl.
CPC .......... *H04L 67/06* (2013.01); *H04L 65/4069* (2013.01); *H04L 67/327* (2013.01)

(58) Field of Classification Search
CPC ..... H04L 1/0007; H04L 47/28; H04L 47/365; H04L 65/4092; H04L 67/02; H04L 67/10; H04L 67/28; H04L 29/06027; H04L 69/326; H04L 43/0882; H04L 65/601; H04L 69/14; H04L 65/4069; G06F 16/113; G06F 16/951; G06T 5/001; H04N 21/4344; H04N 21/23406; H04N 21/442; H04N 21/6581; H04N 21/47202; H04N 21/23103; H04W 36/0005
See application file for complete search history.

(56) References Cited

U.S. PATENT DOCUMENTS 7,143,433 B1 * 11/2006 Duan ............... H04N 21/23103
                                                          725/115
8,606,954 B1 * 12/2013 Abidogun ............ H04N 21/442
                                                          709/231

(Continued)

OTHER PUBLICATIONS

Extended European Search Report for EP Appl. No. 20165271.6, dated Jul. 20, 2020.

(Continued)

*Primary Examiner* — Dustin Nguyen
(74) *Attorney, Agent, or Firm* — Foley & Lardner LLP

(57) ABSTRACT

Described embodiments provide systems and methods for selecting between modes for delivering or providing access to a file. A server can be configured to deliver the file via a plurality of modes of delivery including. A first mode of delivery can include downloading the file and a second mode of delivery can include delivering the file via a virtualized stream. The server can receive a request and initiate downloading of the file for a length of time. The server can identify an amount of available bandwidth and size of the file and determine a first time for the first mode of delivery. The first time can be compared to a second time to deliver the file via the second mode of delivery. The server can select between the first mode of delivery and the second mode of delivery and provide the file via the selected mode of delivery.

20 Claims, 5 Drawing Sheets

(51) Int. Cl.
*H04L 65/61* (2022.01)
*H04L 67/63* (2022.01)

(56) References Cited

U.S. PATENT DOCUMENTS

| | | | | |
|---|---|---|---|---|
| 8,983,910 | B1* | 3/2015 | Panchauli | G06F 16/113 |
| | | | | 707/640 |
| 9,654,528 | B1* | 5/2017 | Cho | H04N 21/23406 |
| 10,015,503 | B1* | 7/2018 | Ahammad | G06T 5/001 |
| 10,019,517 | B2 | 7/2018 | Danovitz et al. | |
| 10,432,686 | B1* | 10/2019 | Wu | H04L 65/601 |
| 2002/0110149 | A1* | 8/2002 | Roberts | H04L 43/0882 |
| | | | | 370/477 |
| 2005/0154996 | A1* | 7/2005 | Othmer | H04L 67/28 |
| | | | | 715/774 |
| 2005/0172030 | A1* | 8/2005 | Fay | H04L 29/06027 |
| | | | | 709/234 |
| 2008/0022012 | A1* | 1/2008 | Wang | H04L 47/365 |
| | | | | 709/238 |
| 2010/0303440 | A1* | 12/2010 | Lin | H04N 21/6581 |
| | | | | 386/241 |
| 2011/0044258 | A1* | 2/2011 | Nezou | H04L 47/28 |
| | | | | 370/329 |
| 2011/0191414 | A1* | 8/2011 | Ma | H04L 67/02 |
| | | | | 709/203 |
| 2013/0031219 | A1* | 1/2013 | Liu | H04N 21/47202 |
| | | | | 709/219 |
| 2013/0058480 | A1* | 3/2013 | Ziskind | H04L 65/4069 |
| | | | | 380/200 |
| 2013/0124679 | A1* | 5/2013 | Harrang | H04L 1/0007 |
| | | | | 709/217 |
| 2014/0258463 | A1* | 9/2014 | Winterrowd | H04L 65/4092 |
| | | | | 709/219 |
| 2014/0330887 | A1* | 11/2014 | Gilberton | H04L 69/326 |
| | | | | 709/202 |
| 2015/0039601 | A1* | 2/2015 | Harrang | G06F 16/951 |
| | | | | 707/727 |
| 2015/0333951 | A1* | 11/2015 | Yeom | H04L 67/10 |
| | | | | 725/95 |
| 2016/0050246 | A1* | 2/2016 | Liao | H04W 36/0005 |
| | | | | 709/219 |
| 2016/0065642 | A1 | 3/2016 | Burnette et al. | |
| 2019/0199763 | A1* | 6/2019 | Demirli | H04L 65/4092 |
| 2020/0322415 | A1* | 10/2020 | Magazine | H04L 69/14 |

OTHER PUBLICATIONS

Examination Report on EP Appl. No. 20165271.6 dated Mar. 7, 2022.

* cited by examiner

SELECTING A MODE OF DELIVERY TO PROVIDE ACCESS TO A FILE SYSTEMS AND METHODS

BACKGROUND

In network environments, files and other content can be made available to a plurality of users of the respective network. The users can share access to the different files and content through the network environment. The users may request access to the files on an urgent or immediate basis.

SUMMARY

Systems and method for selecting between modes for delivering a file to a user are provided herein. A file server hosting or providing access to a plurality of files (e.g., shared files) or other forms of content can establish a session with a device. The device can request at least one file from the file server. The file server can determine of mode of delivery to provide access for the device to the requested file based on a bandwidth of a session between the user and the file server and one or more properties of the requested file. For example, the file server can determine a bandwidth of the session between the file server and the device and determine a size of the file requested. The bandwidth and file size can be used to determine an estimated download time for the file to the device. The file server, based in part on the estimated download time, can determine a method of access to provide the file to the device. For example, the file server can select between a full download of the file, a partial download of the file, or providing a virtual version of the file to the device. Thus, the file server can dynamically determine a method of access based on a bandwidth of a session between the user and the file server and one or more properties of the requested file.

In some embodiments, the file server can simultaneously or in parallel provide the file to a user using at least two methods of access without impacting a quality of either method of access. For example, the file server can simultaneously or in parallel provide through a virtual stream a virtual version of the file and, through a download stream, download the file to the user without impacting or degrading the quality of the streaming virtual version of the file. The virtual stream and the download stream can be established using the session between the file server and the device. For example, the file server can allocate portions of the bandwidth to the virtual stream and download stream. In some embodiments, the value of the bandwidth allocated to the virtual stream or download stream can be selected based in part on a bandwidth threshold or quality threshold corresponding to a quality of the respective stream provided to the device.

The file server can monitor the quality of the virtual stream, the download stream or both the virtual stream and the download stream provided to the device. For example, the file server can measure the bandwidth allocated to the virtual stream, the download stream or both the virtual stream and the download stream. The measured bandwidth can be compared to a bandwidth threshold to determine if the quality of the virtual stream, the download stream or both the virtual stream and the download stream provided to the device is sufficient to support the respective stream. The file server can dynamically modify the bandwidth allocated to the virtual stream, the download stream or both the virtual stream and the download stream to meet a respective bandwidth threshold and thus provide a stream to the device meeting predetermined quality metrics.

In at least one aspect, this disclosure is directed to a method for selecting between modes for delivering a file. The method can include receiving, by a server, a request to download a file. The server can be configured to deliver the file to a client device via a plurality of modes of delivery. The method can include determining, by the server, a first mode of delivery and a second mode of delivery in which to transfer the file using a channel between the server and the client device. The first mode of delivery can include download of the file onto the client device and the second mode of delivery can include virtualization of the file. The method can include selecting, by the server, one of the first mode of delivery or the second mode of delivery based on a first download of a portion of the file. The portion of the file can enable determination of the size of the file and the amount of available bandwidth of the channel. The method can include providing, by the server responsive to the request, the file via one of the selected first mode of delivery or selected second mode of delivery. One of the selected first mode of delivery or selected second mode of delivery can provide access to the file for the client device in a first time period that is less than a second time period for the other of the selected first mode of delivery or selected second mode of delivery.

In some embodiments, the method can include initiating, by the server responsive to the request, the first download of the file for a length of time less than a total time to download the file. The first download can correspond to a partial download of the file. The method can include determining, by the server from the initiated first download, the amount of available bandwidth of the channel and size of the file. In embodiments, the method can include determining, by the server, a time to deliver the file via the second mode or delivery using a virtual stream. The time to deliver the file via the second mode of delivery can be based on a bandwidth requirement for the virtual stream between the client device and the server and through the channel.

The method can include initiating, by the server responsive to the selection, a second download of the file to the client device. The second download can correspond to a full download of the file to the client device. The method can include providing, by the server and in parallel with the second download of the file, the file to the device using the second mode of delivery via a virtualized stream established between the server and the client device. The method can include initiating, by the server, the second mode of delivery of the plurality of modes of delivery to deliver the file to the device via a virtual stream between the client device and the server and through the channel for a length of time. The method can include determining, by the server, the amount of available bandwidth responsive to the initiating the virtualized stream to the device based on a portion of the file provided to the client device during the length of time.

In some embodiments, the method can include downloading, by the server and based on the amount of the available bandwidth, the file to the device using the first mode of delivery through a second download of the file to the client device. The second download can correspond to a full download of the file to the client device. The method can include monitoring, by the server, a bandwidth value allocated for the second mode of delivery via a virtualized stream between the server and the client device. The method can include comparing, by the server, the bandwidth value allocated for the second mode of delivery via the virtualized stream to a bandwidth threshold and modifying, responsive to the comparison, a size of the bandwidth value allocated for the second mode of delivery via the virtualized stream. In some embodiments, the method can include increasing, by the server and responsive to the comparison, the bandwidth value allocated for the second mode of delivery via the virtualized stream. The method can include decreasing, by the server and responsive to the comparison, the bandwidth value allocated for the second mode of delivery via the virtualized stream. The first mode of delivery can include at least one of: full download of the file or partial download of the file.

In at least one aspect, this disclosure is directed to a system for selecting between modes for delivering a file. The system can include a server having one or more processors, coupled to memory. The server can be configured to receive a request to download a file, the server configured to deliver the file to a client device via a plurality of modes of delivery. The server can be configured to determine a first mode of delivery and a second mode of delivery in which to transfer the file using a channel between the server and the client device. The first mode of delivery can include download of the file onto the client device and the second mode of delivery can include virtualization of the file. The server can be configured to select one of the first mode of delivery or the second mode of delivery based on a first download of a portion of the file. The portion of the file can enable determination of the size of the file and the amount of available bandwidth of the channel. The server can be configured to provide, responsive to the request, the file via one of the selected first mode of delivery or selected second mode of delivery. One of the selected first mode of delivery or selected second mode of delivery can provide access to the file for the client device in a first time period that is less than a second time period for the other of the selected first mode of delivery or selected second mode of delivery.

In some embodiments, the server can be configured to initiate, responsive to the request, the first download of the file for a length of time less than a total time to download the file. The first download can correspond to a partial download of the file. The server can be configured to determine, from the initiated first download, the amount of available bandwidth of the channel and size of the file. The server can be configured to determine a time to deliver the file via the second mode or delivery using a virtual stream. The time to deliver the file via the second mode of delivery can be based on a bandwidth requirement for the virtual stream between the client device and the server and through the channel. The server can be configured to initiate, responsive to the selection, a second download of the file to the client device. The second download can correspond to a full download of the file to the client device. The server can be configured to provide, in parallel with the second download of the file, the file to the device using the second mode of delivery via a virtualized stream established between the server and the client device.

In some embodiments, the server can be configured to initiate the second mode of delivery of the plurality of modes of delivery to deliver the file to the device via a virtual stream between the client device and the server and through the channel for a length of time. The server can be configured to determine the amount of available bandwidth responsive to the initiating the virtualized stream to the device based on a portion of the file provided to the client device during the length of time.

The server can be configured to download, based on the amount of the available bandwidth, the file to the device using the first mode of delivery through a second download of the file to the client device. The second download can correspond to a full download of the file to the client device. In some embodiments, the server can be configured to monitor a bandwidth value allocated for the second mode of delivery via a virtualized stream between the server and the client device. The server can be configured to compare the bandwidth value allocated for the second mode of delivery via the virtualized stream to a bandwidth threshold. The server can be configured to modify, responsive to the comparison, a size of the bandwidth value allocated for the second mode of delivery via the virtualized stream.

In at least one aspect, a non-transitory computer-readable medium is provided. The non-transitory computer-readable medium can include instructions that, when executed by the processor of a device, cause the processor to receive a request to download a file, the server configured to deliver the file to a client device via a plurality of modes of delivery. The instructions that, when executed by the processor of a device, cause the processor to determine a first mode of delivery and a second mode of delivery in which to transfer the file using a channel between the server and the client device. The first mode of delivery can include download of the file onto the client device and the second mode of delivery can include virtualization of the file. The instructions that, when executed by the processor of a device, cause the processor to select one of the first mode of delivery or the second mode of delivery based on download of a portion of the file. The portion of the file can enable determination of the size of the file and the amount of available bandwidth of the channel. The instructions that, when executed by the processor of a device, cause the processor to provide, responsive to the request, the file via one of the selected first mode of delivery or selected second mode of delivery. In embodiments, one of the selected first mode of delivery or selected second mode of delivery can provide access to the file for the client device in a first time period that is less than a second time period for the other of the selected first mode of delivery or selected second mode of delivery.

In some embodiments, the instructions that, when executed by the processor of a device, cause the processor to initiate, responsive to the request, the first download of the file for a length of time less than a total time to download the file. The first download can correspond to a partial download of the file. The instructions that, when executed by the processor of a device, cause the processor to determine, from the initiated first download, the amount of available bandwidth of the channel and size of the file.

In some embodiments, the instructions that, when executed by the processor of a device, cause the processor to monitor a bandwidth value allocated for the second mode of delivery via a virtualized stream between the server and the client device. The instructions that, when executed by the processor of a device, cause the processor to compare the bandwidth value allocated for the second mode of delivery via the virtualized stream to a bandwidth threshold. The instructions that, when executed by the processor of a device, cause the processor to modify, responsive to the comparison, a size of the bandwidth value allocated for the second mode of delivery via the virtualized stream.

The details of various embodiments of the disclosure are set forth in the accompanying drawings and the description below.

BRIEF DESCRIPTION OF THE DRAWING FIGURES

Objects, aspects, features, and advantages of embodiments disclosed herein will become more fully apparent from the following detailed description, the appended claims, and the accompanying drawing figures in which like reference numerals identify similar or identical elements. Reference numerals that are introduced in the specification in association with a drawing figure may be repeated in one or more subsequent figures without additional description in the specification in order to provide context for other features, and not every element may be labeled in every figure. The drawing figures are not necessarily to scale, emphasis instead being placed upon illustrating embodiments, principles and concepts. The drawings are not intended to limit the scope of the claims included herewith.

DETAILED DESCRIPTION

Figure 1:
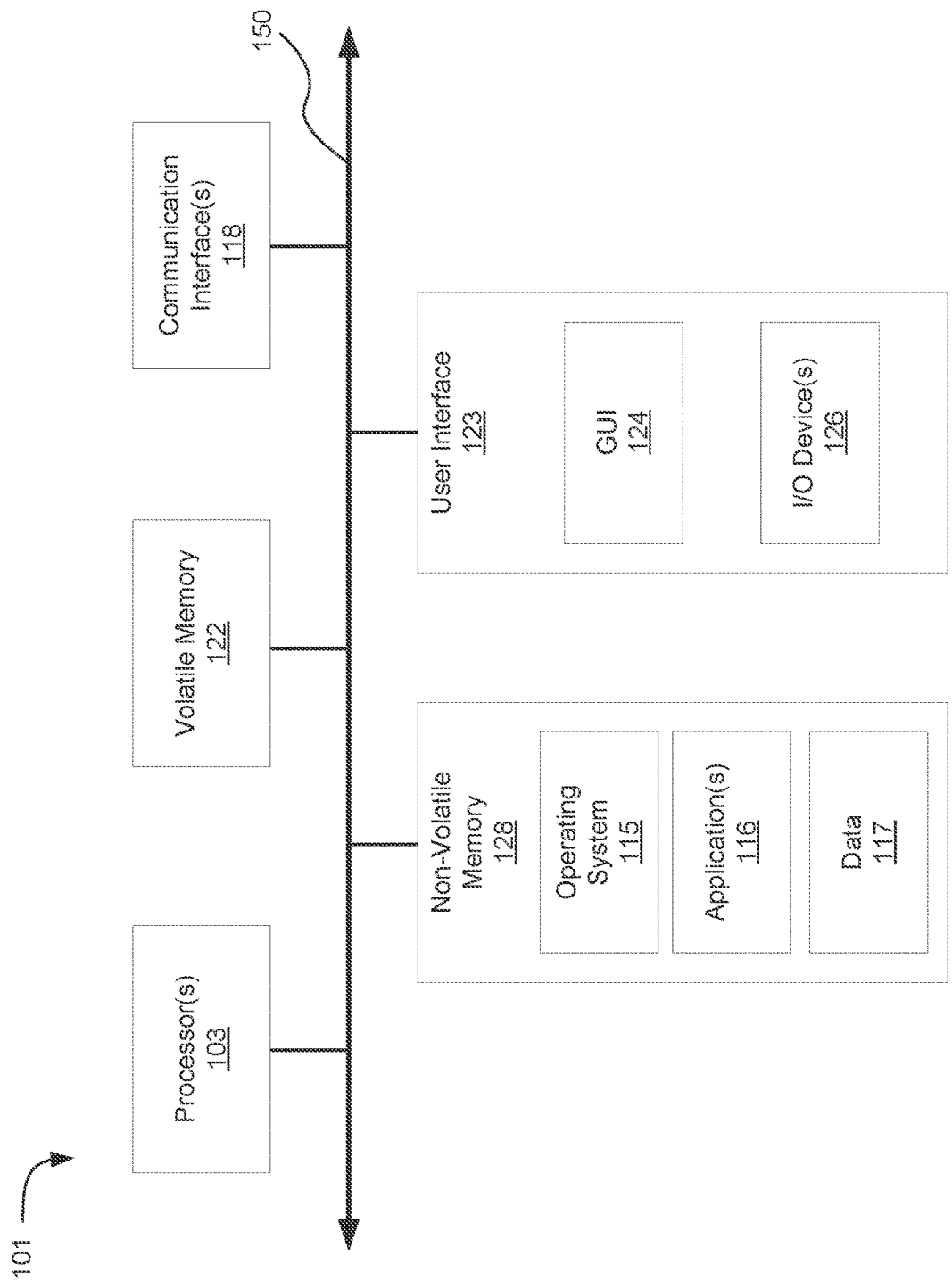
FIG. 1 is a block diagram of embodiments of a computing device.

For purposes of reading the description of the various embodiments below, the following descriptions of the sections of the specification and their respective contents may be helpful:

As previously described, a network environment or networking system for an organization can provide access to a plurality of files through one or more servers. The users can access the files from different client devices through a plurality of channels to the one or more servers. A user-experience or user interaction with a file to be accessed can be impacted by multiple factors, such as, properties of a network, a client device, the server, file to be access and properties of the channel between the respective client device and at least one server. Users may wish to access files instantly or on an urgent basis. To meet the urgent time demand of the request, the files can be provided in a preview mode having limited functionality to allow the respective users to preview the requested files. For example, the user can be provided a preview version of the file in the form of a virtualized version of the file. However, the preview version may include limitations on the users ability to interact with the respective file or perform different tasks with the file can be limited when previewing the file. The users may be limited to previewing the files when online or actively connected to the network. For example, the user may only be able to access the virtualized version online. The preview version may be compatible with a limited set of file types. The preview version of the file may have limited functionality (e.g., read only). For instance, a manual input or intervention may be required to determine on whether to download the file or provide a virtualized version of the file. Thus, the quality of a streaming-experience can depend on network properties, client device properties, bandwidth properties and/or client device properties. The user-experience and/or quality of the streaming-experience can be impacted by an amount of available bandwidth for the channel between the client device and the server and a size of a file to be accessed. For example, due to low bandwidth conditions, a large size of the file to be accessed or a combination of both low bandwidth conditions and the large size of the file to be accessed, the user may not be able to access or receive the file instantly or within a desired time period.

Systems and methods described here provide selection of a mode of delivery and access to a file based in part on an amount of available bandwidth and a file size of the file to be accessed. For example, a server can dynamically select between a first mode of delivery to deliver the file through a download to a client device or a second mode of delivery to provide a virtualized version of the file to the client device. The selection can be made based in part on an amount of available bandwidth between the server and the client device and a size of the requested file. In some embodiments, the file can be provided to the client device through multiple modes of delivery in parallel (e.g., simultaneously) such that the user can be provided a virtual version of the file while the file downloads a client device of the user. A server can dynamically monitor and modify bandwidth values for the virtual stream to the client device such that the quality of the virtual stream to the client device is not impacted by the parallel downloading of the file to the client device. Thus, a user of the client device can be provided access to the file on an urgent basis through the selection of a mode of delivery that provides the file to the client device in least amount of time. Further, the modification of bandwidth values can mitigate or otherwise prevent adverse impacts to the user-experience and/or the quality of a streaming-experience as the file is provided through multiple modes of delivery (e.g., download, virtualization) to the client device.

Section A describes a computing environment which may be useful for practicing embodiments described herein; and Section B describes methods and systems for selecting between modes for delivering a file.

A. Computing Environment

Prior to discussing the specifics of embodiments of the systems and methods of selecting between modes for delivering a file, it may be helpful to discuss the computing environments in which such embodiments may be deployed.

As shown in FIG. 1, computer 101 may include one or more processors 103, volatile memory 122 (e.g., random access memory (RAM)), non-volatile memory 128 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 123, one or more communications interfaces 118, and communication bus 150. User interface 123 may include graphical user interface (GUI) 124 (e.g., a touchscreen, a display, etc.) and one or more input/output (I/O) devices 126 (e.g., a mouse, a keyboard, a microphone, one or more speakers, one or more cameras, one or more biometric scanners, one or more environmental sensors, one or more accelerometers, etc.). Non-volatile memory 128 stores operating system 115, one or more applications 116, and data 117 such that, for example, computer instructions of operating system 115 and/or applications 116 are executed by processor(s) 103 out of volatile memory 122. In some embodiments, volatile memory 122 may include one or more types of RAM and/or a cache memory that may offer a faster response time than a main memory. Data may be entered using an input device of GUI 124 or received from I/O device(s) 126. Various elements of computer 101 may communicate via one or more communication buses, shown as communication bus 150.

Computer 101 as shown in FIG. 1 is shown merely as an example, as clients, servers, intermediary and other networking devices and may be implemented by any computing or processing environment and with any type of machine or set of machines that may have suitable hardware and/or software capable of operating as described herein. Processor(s) 103 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A "processor" may perform the function, operation, or sequence of operations using digital values and/or using analog signals. In some embodiments, the "processor" can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors. A processor including multiple processor cores and/or multiple processors multiple processors may provide functionality for parallel, simultaneous execution of instructions or for parallel, simultaneous execution of one instruction on more than one piece of data.

Communications interfaces 118 may include one or more interfaces to enable computer 101 to access a computer network such as a Local Area Network (LAN), a Wide Area Network (WAN), a Personal Area Network (PAN), or the Internet through a variety of wired and/or wireless or cellular connections.

In described embodiments, the computing device 101 may execute an application on behalf of a user of a client computing device. For example, the computing device 101 may execute a virtual machine, which provides an execution session within which applications execute on behalf of a user or a client computing device, such as a hosted desktop session. The computing device 101 may also execute a terminal services session to provide a hosted desktop environment. The computing device 101 may provide access to a computing environment including one or more of: one or more applications, one or more desktop applications, and one or more desktop sessions in which one or more applications may execute.

Additional details of the implementation and operation of network environment, computer 101 and client and server computers may be as described in U.S. Pat. No. 9,538,345, issued Jan. 3, 2017 to Citrix Systems, Inc. of Fort Lauderdale, Fla., the teachings of which are hereby incorporated herein by reference.

B. Selecting Between Modes for Delivering a File

The systems and methods described herein select or determine modes of delivery to provide access to a file for a device based on a bandwidth of a session between a file server and the device and one or more properties of the requested file. The file server can include a file database for storing a plurality if files to be shared and/or accessed by a group of users. The file server can establish sessions with a plurality of devices to provide or otherwise share files with users at the plurality of devices. Responsive to a request from at least one device to access at least one file, the file server can determine an appropriate mode of access to provide the file to the respective device. For example, the file server can determine a bandwidth of a session to the respective device and a size of the file requested by the device. The file server can generate an estimated download time based on the bandwidth and the size of the file. Using the estimated download time, the file server can determine a mode of delivering or otherwise providing access to the requested file. The modes of delivery (e.g., methods of access) to provide access to the file can include providing a full download of the file, providing a partial download of the file, or providing a virtual version of the file.

The file server can determine a method of access based in part on the estimated download time and a virtualization time. For example, the virtualization time can correspond to a time threshold generated by the file server indicating a time to establish a virtual stream to the device to provide a virtual version of the file. The file server can compare the estimated download time to the virtualization time to determine the fastest or most appropriate method of access to provide the file to the device. In some embodiments, the file server can provide the file to the device through multiple methods of access. For example, the file server can establish a virtual stream through the session between the device and the file server to provide a virtual version of the file. With the virtual stream established, the file server can also establish a download stream through the session between the device and the file server to download the file the device. The file server can provide the virtual stream to provide a preview version or temporary access to the file as the file downloads to the device of the user and the user waits for the file to download to complete. Thus, the user can interact with the file through the virtual stream as the user waits for the download of the file to be received and completed at the device. The virtual stream and the download stream can each be allocated a portion of the bandwidth of the session between the device and the file server to simultaneously or in parallel provide the virtual version of the file and download the file to the device. Thus, the device can be provided immediate access to the file in addition to having the file downloaded.

In some embodiments, the file server can monitor the quality of the virtual stream and the download stream and modify properties to the respective streams to maintain a desired quality level. For example, the file server can monitor and measure the bandwidth of the virtual stream, the download stream or both the virtual stream and the download stream. The measured bandwidths can be compared to a bandwidth threshold to determine if the quality of the virtual stream and/or the download stream are greater than the desired quality level. In some embodiment, if the quality of the virtual stream and the download stream are greater than the desired quality level, the file server can increase the bandwidth allocated to the virtual stream, download stream, or both the virtual stream and the download stream. In some embodiment, if the quality of the virtual stream and/or the download stream are less than the desired quality level, the file server can decrease the bandwidth allocated to the virtual stream, download stream, or both the virtual stream and the download stream. Thus, the file server can dynamically modify the properties of the virtual stream and the download stream to maintain the desired quality level.

Figure 2:
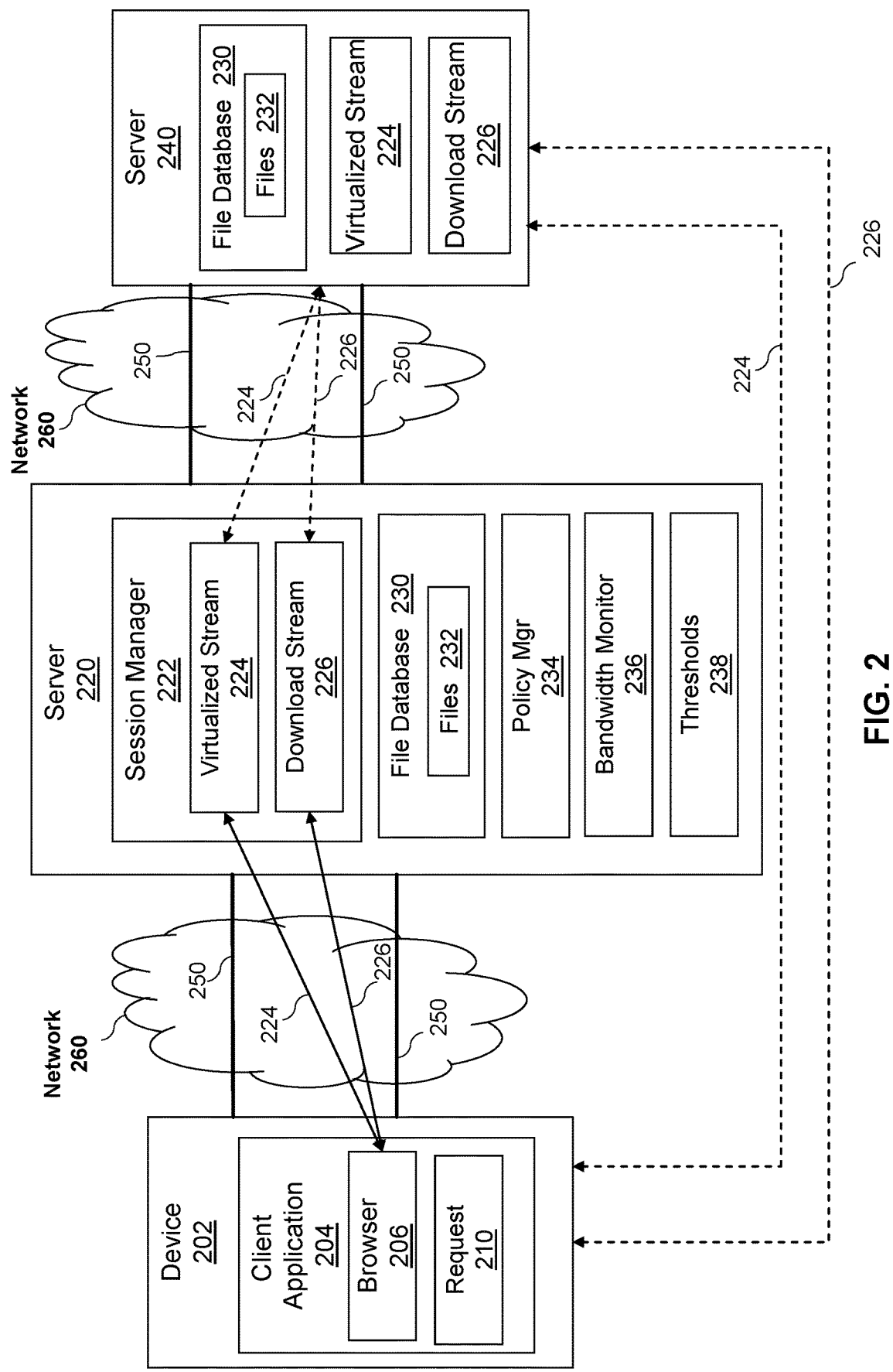
FIG. 2 is a block diagram of a system for selecting between modes for delivering a file.

Referring to FIG. 2, depicted is a block diagram of one embodiment of a server 220 disposed within a network 260 with at least one device 202 (e.g., client device) and a server 240. The filer server 220 can correspond to a file sharing server to store and share files and other forms of content between a plurality of devices 202. The devices 202 can correspond to a plurality of users or group of users. The files and/or other forms of content can be stored at the server 220 or one or more remote servers 240 coupled with the server 220 through a network 260. The server 220 can be configured to determine a method of access to provide to one or more files 232 stored in a file database 230 to a device 202.

The server 220 can include a session manager 222 to establish and maintain one or more channels 250 between the device 202 and the server 220, between the server 220 and a remote server 240, and/or between the device 202 and the remote server 240. In some embodiments, the session manager 222 can establish one or more channels 250 to one or more devices 202 and/or one or more remote servers 240. The channels 250 can include a session or connection established between a device 202 and the server 202, and/or server 240 to enable the server 220 to exchange content or data with other devices. For example, the session manager 222 can establish one or more channels 250 between the device 202 and the server 220. The session manager 222 can establish one or more channels 250 between the device 202 and a remote server 240. The session manager 222 can establish one or more channels 250 between the server 220 and a remote server 240.

In some embodiments, the session manager 222 can establish multiple channels 250 at the same time between the device 202 and the server 220 and/or a remote server 240 such that the multiple channels 250 are executing simultaneously to provide the device 202 access to multiple files 232. The channels 250 may include, but not limited to, a virtual session, an application session, an execution session, a desktop session, a hosted desktop session, a terminal services session, a browser session, a remote desktop session, a URL session and a remote application session. Channels 250 may include any type of transport layer connection. For example, the channels 250 can include any type of transport layer connection established between at least one device 202 and the server 220 and/or a remote server 240 through the network 260. In some embodiments, the channels 250 can include a session established via a connection, such as a secure sockets layer (SSL) session over a transmission control protocol (TCP) connection. Channels 250 may include encrypted and/or secure sessions established between the device 202 and the server 220 and/or a remote server 240. For example, the channels 250 may include encrypted sessions and/or secure sessions established between at least one device 202 and the server 220 and/or a remote server 240 through the network 260. The encrypted channels 250 can include encrypted files 232, data and/or traffic transmitted between at least one device 202 and the server 220 and/or a remote server 240 through the network 260.

A virtual stream 224 can be established by the server 220 to provide a virtual version or virtual access (e.g., file virtualization) to a file 232 for the device 202. The virtual version of the file 232 can correspond to a digitally replicated version of the file 232 as compared to a downloaded version of the file 232. In embodiments, the virtual version of the file 232 can correspond to a version of the file 232 that has been virtualized. In some embodiments, the virtual version of the file 232 can have the same functionality as a downloaded version of the file 232. For example, a user provided a virtual version of the file 232 can be permitted to read the file 232, edit the file 232 and/or write to the file 232. In some embodiments, the virtual version of the file 232 can have different functionality as compared to a downloaded version of the file 232. For example, a user provided a virtual version of the file 232 may be limited to read only access to the file 232. The file 232 can be provided to the user through the virtual stream 224. The virtual stream 224 can include a connection between the device 202 and the server 220 or a remote server 240. The virtual stream 224 can include a channel 250 between the device 202 and the server 220 or a remote server 240. The virtual stream 224 can be established within an existing channel 250 or as part of a new channel 250. The virtual stream 224 can be established independent of a channel 250 and thus, correspond to an independent connection to the device 202 from the server 220 or remote server 240. The server 220 can establish a single virtual stream 224 to each device 202 from the server 220 or remote server 240. The server 220 can establish multiple virtual streams 224 to each device 202 from the server 220 or remote server 240. The server 220 can establish multiple virtual streams 224 to a single device 202 from the server 220 or remote server 240. The multiple virtual streams 226 can execute in parallel or simultaneously with each other to provide virtual versions of multiple files 232 to a device 202 simultaneously.

A download stream 226 can be established by the server 220 to download a file 232 to the device 202 to provide access to a file 232 for the device 202. A user can be provided access to a downloaded version of the file 232 through the download stream 226. The downloaded version of the file 232 can include full functionality of the file 232 (e.g., read access, write access). In some embodiments, a downloaded version of the file 232 can include partial functionality of the file 232 (e.g., read only access, partial download). The download stream 226 can include a connection between the device 202 and the server 220 or a remote server 240. The download stream 226 can include a channel 250 between the device 202 and the server 220 or a remote server 240. The download stream 226 can be established within an existing channel 250 or as part of a new channel 250. The download stream 226 can be established independent of a channel 250 and thus, correspond to an independent connection to the device 202 from the server 220 or remote server 240. The server 220 can establish a single download stream 226 to each device 202 from the server 220 or remote server 240. The server 220 can establish multiple download streams 226 to each device 202 from the server 220 or remote server 240. The server 220 can establish multiple download streams 226 to a single device 202 from the server 220 or remote server 240. The multiple download streams 226 can execute in parallel or simultaneously with each other to provide multiple files 232 to a device 202 simultaneously. In some embodiments, the server 220 can transmit a file 232 through multiple download streams 226.

The server 220 can include can include a file database 230 to store a plurality of files 232. The server 220 can be implemented using hardware or a combination of software and hardware. For example, each component of the server 220 can include logical circuitry (e.g., a central processing unit or CPU) that responses to and processes instructions fetched from a memory unit (e.g., file database 230). Each component of the server 220 can include or use a microprocessor or a multi-core processor. A multi-core processor can include two or more processing units on a single computing component. Each component of the server 220 can be based on any of these processors, or any other processor capable of operating as described herein. Each processor can utilize instruction level parallelism, thread level parallelism, different levels of cache, etc. For example, the server 220 can include at least one logic device such as a computing device or server having at least one processor to communicate via a network 260. The components and elements of the server 220 can be separate components or a single component. For example, the file database 230 can include combinations of hardware and software, such as one or more processors configured to initiate stop commands, initiate motion commands, and transmit or receive timing data, for example. The file database 230 can include a structured set of data stored for the server 220. For example, the file database 230 can include a plurality of files 232. The files 232 can be received by the server 220 from a device 202 or a remote server 240. The file database 230 can include a memory component to store and retrieve data, such as, files 232. The memory can include a random access memory (RAM) or other dynamic storage device, coupled with the file database 230 for storing information, and instructions to be executed by the server 220. The memory can include at least one read only memory (ROM) or other static storage device coupled with the file database 230 for storing static information and instructions for the server 220. The memory can include a storage device, such as a solid state device, magnetic disk or optical disk, coupled with the file database 230 to persistently store information and instructions.

The server 220 can include a policy manager 234. The policy manager 234 can include a database and be configured to generate and/or store authentication credentials for one or more devices 202. The policy manager 234 can generate and/or store encryption codes and decryption codes for the files 232 stored in the file database 230. In some embodiments, the policy manager 234 can receive the authentication credentials from the authentication server or from a device 202 and store the authentication credentials responsive to receiving them. The policy manager 234 can be configured to provide enforcement support for channels 250 (e.g., streams 224, 226, connections) between the server 220 and a device 202, between the server 220 and a remote server 240, and/or between a device 202 and a remote server 240. For example, the policy manager 234 can be configured to generate and apply access policies to control access to the file 232. The access policies can indicate if access is allowed or prevented. The access policies can indicate a level of access. For example, the policy manager 234 can determine a level of access to a file 232 responsive to a request to access the respective file 232. The access policies can indicate a method of access, such as but not limited to, a full download, a partial download and/or a virtual version of the file 223. The policy manager 234 can assign at least one access policy to each file 232. The access policies can correspond to a user of the device 202, a group of users, properties (e.g., security walls) of the device 202, and/or the type of file 232.

The server 220 can include a bandwidth monitor 236. The bandwidth monitor 236 can include a function, protocol or instructions for tracking and monitoring properties of a channel 250, a virtual stream 224, and/or a download stream 226. The bandwidth monitor 236 can measure a bandwidth of a channel 250, a virtual stream 224, and/or a download stream 226 between the device 202 and the server 220 and/or a remote server 240. The bandwidth monitor 236 can determine an amount to allocate to a virtual stream 224, and/or a download stream 226. The bandwidth monitor 236 can determine an amount to increase the bandwidth allocated to a virtual stream 224, and/or a download stream 226. The bandwidth monitor 236 can determine an amount to decrease the bandwidth allocated to a virtual stream 224, and/or a download stream 226 (e.g., operations 340, 370, 380 and 385 of method 300 described below with respect to FIGS. 3A-3C). The bandwidth monitor 236 can transmit or provide the dynamic bandwidth data to the server 220 to dynamically modify one or more properties of a channel 250, a virtual stream 224, and/or a download stream 226. In some embodiments, the bandwidth monitor 236 may be transformed into a special-purpose microprocessor by executing computer-executable instructions or by otherwise being programmed.

The server 220 can include one or more thresholds 238. The thresholds 238 can correspond to bandwidth thresholds 238 or quality thresholds 238. The threshold 238 can indicate a quality of a channel 250 and/or a stream (e.g., virtual stream 224, download stream 226). The quality of the channel 250 and/or a stream can correspond to a level of service experienced by a user of a device 202 interacting with the channel 250 and/or stream to access a file 232. For example, the quality of channel 250 and/or stream can correspond to a bandwidth that is equal to or greater than a bandwidth threshold such that the user of the device does not experience interruptions, reduced download speed (e.g., slowing down, freezing) or other forms of issues in accessing the file 232. In embodiments, a bandwidth value that is equal to or greater than a bandwidth threshold 238 or is in a range corresponding to the bandwidth threshold 238 can correspond to a greater or high quality of service for a device 202 coupled to the channel 250 and/or stream (e.g., increased bandwidth). A bandwidth value that is less than a bandwidth threshold 238 can correspond to a low quality of service or degraded server for a device 202 coupled to the channel 250 and/or stream (e.g., decreased bandwidth). The bandwidth threshold 238 can be generated by the server 220 or an administrator of the server 220 (e.g., configuration parameter). In some embodiments, the bandwidth threshold 238 can be determined based in part on the available bandwidth of the channel 250 or channels 250 to the device 202. For example, the bandwidth threshold 238 can correspond to a percentage or portion of the available bandwidth of the channel 250 or channels 250 to the device 202. In embodiments, the bandwidth threshold 238 can range from fifty percent of the available bandwidth to ninety percent of the available bandwidth. The bandwidth threshold 238 can vary within or outside this range.

In some embodiments, the bandwidth threshold 238 can be determined based in part on a bandwidth allocated to previous channels 250 or streams (e.g., virtual stream 224, download stream 226) established to the device 202. For example, a user experience associated with bandwidths previous allocated to channels 250 or streams can be determined based in part on a number of modifications (e.g., increases, decreases) needed to provide the file 232 to the device 202. A final bandwidth used in a previous channel 250 or streams that successfully provided the file 232 to the device 202 through a virtual version, download or both can be used to establish subsequent bandwidth thresholds 238. The bandwidth threshold 238 can be set as a percentage or portion of the previous bandwidths allocated to the channels 250 or streams established to the device 202. For example, in one embodiment, the bandwidth threshold 238 can be set to be five percent less than a final bandwidth used in a previous channel 250 or streams that successfully provided the file 232 to the device 202. The bandwidth threshold 238 can vary from the final bandwidth of a previous channel 250 or stream by an amount greater than or less than five percent. The bandwidth threshold 238 can be expressed in units of data. For example, in some embodiments, the bandwidth threshold 238 can correspond to a numerical value in terms of megabits per second (mbps) or a range of numerical values in terms of megabits per second (mbps).

The server 220 can include a processor. The processor can include non-volatile memory that stores computer instructions and an operating system. For example, the computer instructions can be executed by the processor out of volatile memory to perform all or part of the method 300. The server 220 can include a non-transitory computer-readable medium that includes instructions that, when executed by the processor of the server 220 (or device) cause the processor to execute or perform the functionalities of the method 300.

The device 202 can include a client device, such as, but not limited to a computing device or a mobile device. The device 202 can couple with the server 220 and/or server 240 through network 260. The device 202 can include or correspond to an instance of any client device, mobile device or computer device described herein. For example, the device 202 can be the same as or substantially similar to computer 101 of FIG. 1. The device 202 can include a browser 206 for accessing, downloading or interacting with a file 232. For example, the browser 206 can couple with the server 220 or server 240 to receive a virtual version of a file 232 through a virtual stream 224. The browser 206 can couple with the server 220 or server 240 to download a file 232 through a download stream 226. In some embodiments, the browser 206 can include a CEB (e.g., client embedded browser). The browser 206 can include elements and functionalities of a web browser application or engine. The browser 206 can locally render one or more files 232 for the device 202. The device 202 can execute or run a client application 204. For example, the client application 204 can execute or run within the browser 206. The client application 204 can be configured to receive and interact with a file 232. For example, the client application 204 can correspond to a program to execute a file 232, read a file 232, edit a file 232 or otherwise interact with a file 232 stored within the file database 230. The device can generate a request 210. The request 210 can indicate a request to access at least one file 232 from the server 220 or a remote server 240. The request 210 can identify a single file 232 for access by the device 202. The request 210 can identify multiple files 232 for access by the device 202. The request 210 can identify the file 232 and file properties. For example, the request 210 can include a file type, a file identifier, a size of the file 232 and/or a location of file 232, such as but not limited to, a file database 230 storing the file 232 or a remote sever 240 storing the file 232.

The server 240 can correspond to a remote or third party server to store one or more file 232. For example, the server 240 can include can include a file database 230 to store a plurality of files 232. The server 240 can be implemented using hardware or a combination of software and hardware. For example, each component of the server 240 can include logical circuitry (e.g., a central processing unit or CPU) that responses to and processes instructions fetched from a memory unit (e.g., file database 230). Each component of the server 240 can include or use a microprocessor or a multi-core processor. A multi-core processor can include two or more processing units on a single computing component. Each component of the server 240 can be based on any of these processors, or any other processor capable of operating as described herein. Each processor can utilize instruction level parallelism, thread level parallelism, different levels of cache, etc. For example, the server 240 can include at least one logic device such as a computing device or server having at least one processor to communicate via a network 260. The server 240 can include or establish at least one virtual stream 224 to the device 202 or to the server 220 to provide a virtual version or virtual access to a file 232. The server 240 can include or establish at least one download stream 226 to the device 202 or to the server 220 to provide download a file 232 to the device 202 or the server 220.

Network 260 may be a public network, such as a wide area network (WAN) or the Internet. In some embodiments, network 260 may be a private network such as a local area network (LAN) or a company Intranet. Network 260 may employ one or more types of physical networks and/or network topologies, such as wired and/or wireless networks, and may employ one or more communication transport protocols, such as transmission control protocol (TCP), internet protocol (IP), user datagram protocol (UDP) or other similar protocols. In some embodiments, device 202 and server 240 may be on the same network 260. In some embodiments, device 202 and server 240 may be different networks 260. The network 260 can include a virtual private network (VPN). The VPN can include one or more encrypted channels 250 from the device 202 to the server 220 or the servers 240 over network 260 (e.g., internet, corporate network, private network).

Each of the above-mentioned elements or entities is implemented in hardware, or a combination of hardware and software, in one or more embodiments. Each component of the server 220 may be implemented using hardware or a combination of hardware or software detailed above in connection with FIG. 1. For instance, each of these elements or entities can include any application, program, library, script, task, service, process or any type and form of executable instructions executing on hardware of a client device (e.g., the device 202). The hardware includes circuitry such as one or more processors in one or more embodiments. In some embodiments, the components of the server 220 may be implemented or include a non-transitory computer-readable medium that includes instructions that, when executed by a processor of the server 220 (or device) cause the processor to execute or perform the functionalities of the method 300.

Figure 3A:
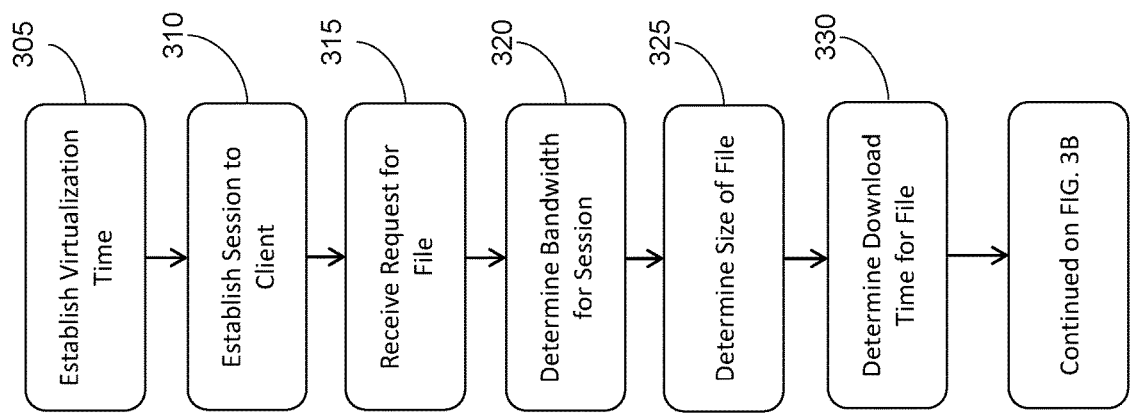
FIGS. 3A-3C are a flow diagram of a method for selecting between modes for delivering a file.
Figure 3B:
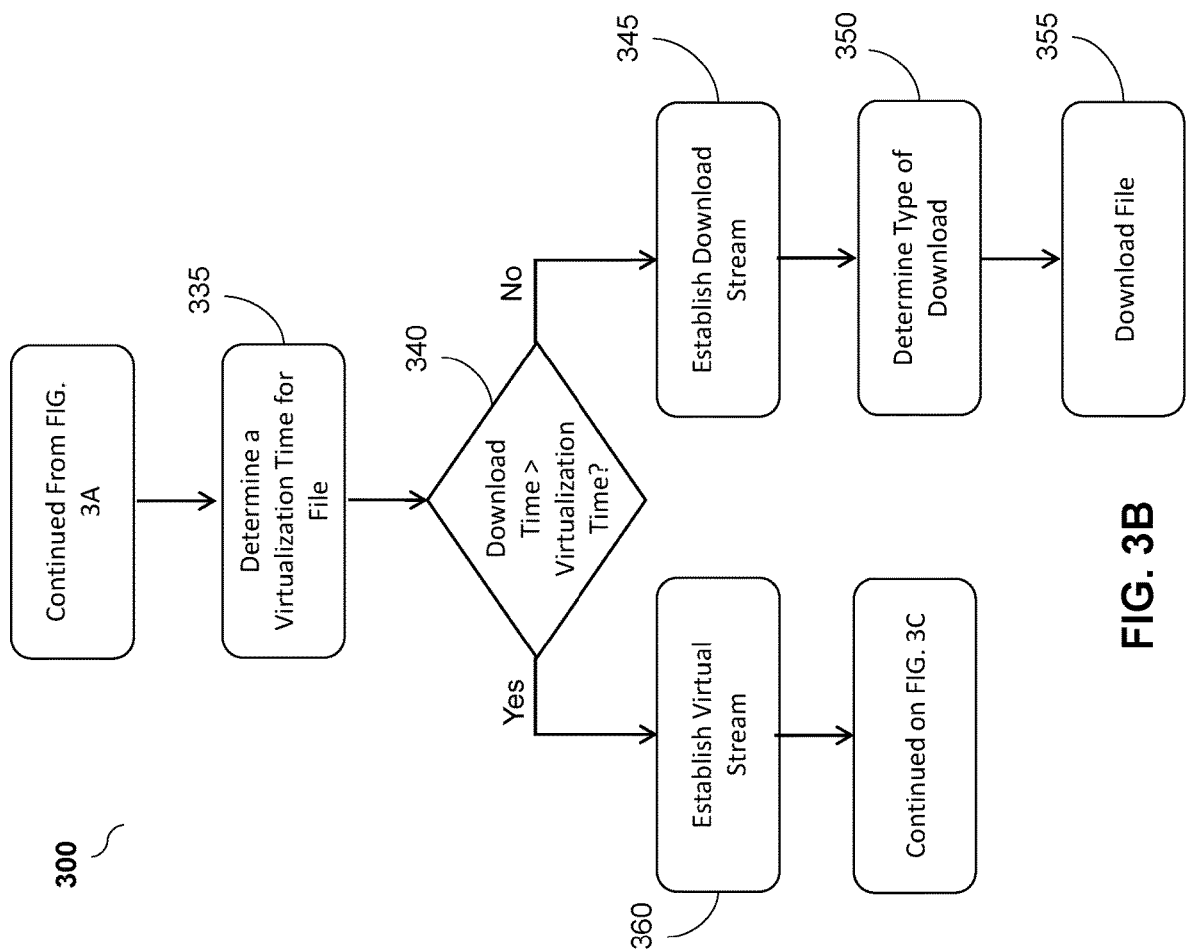
Figure 3C:
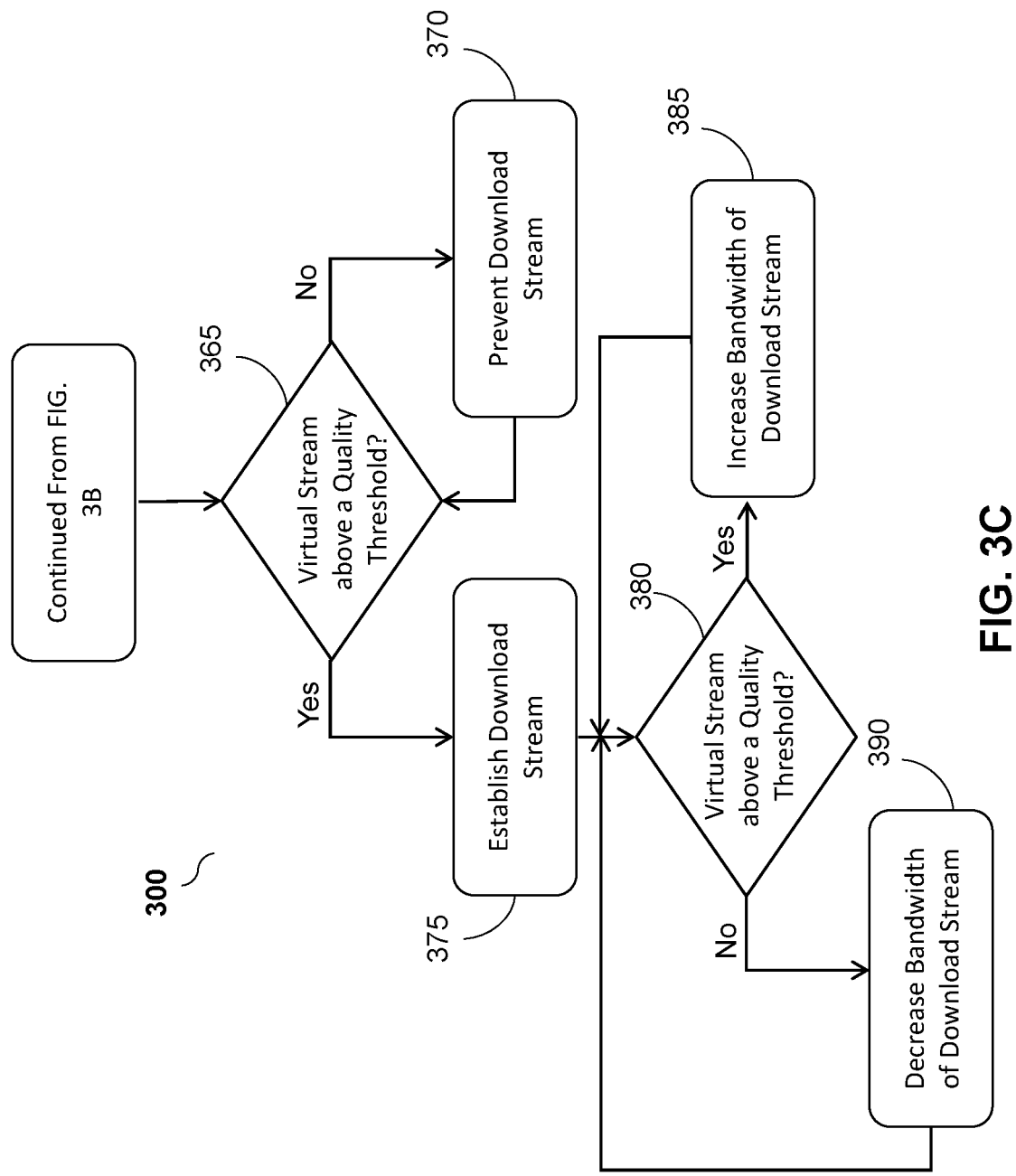

Referring now to FIGS. 3A-3C, depicted is a flow diagram of one embodiment of a method 300 for determining a mode of delivery to provide access to a file 232 for a device 202 based on a bandwidth of a channel 250 between a server 220 and the device 202 and one or more properties of the requested file 232. The functionalities of the method 300 may be implemented using, or performed by, the components detailed herein in connection with FIGS. 1-2. In brief overview, a virtualization time can be established (305). A session to a device 202 can be established (310). A request 210 for a file 232 can be received (315). A bandwidth for the session can be determined (320). A size of the file 232 can be determined (325). A download time for the file 232 can be determined (330). A virtualization time for the file 232 can be determined (335). The download time can be compared to the virtualization time (340). If the download time is less than the virtualization time, a download stream 226 can be established to the device 202 (345). A type of download can be determined (350). The file 232 can be downloaded to the device 202 (355). If the download time is greater than or equal to the virtualization time, a virtual stream 224 can be established to the device 202 (360). A quality of the virtual stream 224 can be monitored (365). If a property of the virtual stream is less than a threshold value, the establishment of a download stream can be prevented (370). If a property of the virtual stream is greater than or equal to the threshold value, a download stream 226 can be established to the device 202 (375). Properties of the virtual stream can be compared to the threshold value (380). If a property of the virtual stream is greater than or equal to the threshold value, a bandwidth of the download stream can be increased (385). If a property of the virtual stream is less than a threshold value, a bandwidth of the download stream can be decreased (390).

Referring now to operation (305), and in some embodiments, a virtualization time can be established. A server 220 can determine and/or generate a virtualization time or a second time for a second mode of delivery to deliver a file. The virtualization time can correspond to a time (e.g., time period, duration) to establish or initialize a virtual stream 224 to a device 202 from the server 220 or a remote server 240. The virtualization time can indicate a time to deliver a virtual version of a file 232 (e.g., virtualization of a file 232) or other forms of content (e.g., virtualized content) to a device 202. The server 220 can determine a time value that it takes to establish or initialize a virtual stream 224 based on previous virtual stream 224 established to a device 202. The server 220 can determine a time value that it takes to establish or initialize a virtual stream 224 based on an average time value of previous virtual streams 224 established to a plurality of devices 202. The server 220 can determine a time value that it takes to establish or initialize a virtual stream 224 based on a desired time value or properties of the server 220 and/or a device 202. In some embodiments, the virtualization time can be an administrator configured parameter generated by an administrator of the server 220. The same virtualization time can be used for each channel 250 established between a device 202 (or a plurality of devices 202) and the server 220, or server 240. In some embodiments, the virtualization time can be established for a single channel 250 or group of channels 250. For example, a unique or specific virtualization time can be generated for each channel 250 established between a device 202 (or a plurality of devices 202) and the server 220, or server 240. The same virtualization time can be used for each virtual channel 250 established between a device 202 (or a plurality of devices 202) and the server 220, or server 240. In some embodiments, the virtualization time can be established for a single virtual stream 224 or group of virtual streams 224. For example, a unique or specific virtualization time can be generated for each virtual stream 224 established between a device 202 (or a plurality of devices 202) and the server 220, or server 240.

Referring now to operation (310), and in some embodiments, a channel 250 to a device 202 can be established through network 260. The server 220 can establish at least one channel 250 to a device 202. For example, the server 220 can establish one or more channels 250 to the device 202 through a browser 206 of the device. The server 220 can establish a plurality of channels 250 (e.g., two or more) to the device 202. The server 220 can establish at least one channel 250 to a plurality of devices 202. The server 220 can establish a plurality of channels 250 (e.g., two or more) to a plurality of devices 202. In some embodiments, the server 220 can establish multiple channels 250 at the same time between the device 202 and the server 220 and/or server 240 such that the multiple channels 250 are executing simultaneously to provide the device 202 access to multiple files 232 hosted by the server 220 and/or server 240. The channel 250 may include, but not limited to, an application session, an execution session, a desktop session, a hosted desktop session, a terminal services session, a browser session, a remote desktop session, a URL session and a remote application session. The channel 250 may include encrypted and/or secure sessions established between the device 202 and the server 220 and/or the server 240. For example, the channel 250 may include an encrypted session and/or a secure session established between the device 202 and the server 220 and/or the server 240. The encrypted channel 250 can include an encrypted file, encrypted data or traffic transmitted between the device 202 and the server 220 and/or the server 240.

Referring now to operation (315), and in some embodiments, a request 210 for a file 232 can be received (315). For example, method 300 can include receiving, by a server 220, a request 210 from a device 202 through a channel 250 established between the device 202 and the server 220. In some embodiments, the server 220 can receive a request 210 to download a file 232. The request 210 can identify a file 232 of a plurality of files 232 provided by the server 220. The device 202 can transmit the request 210 through the channel 250 to the server 220 for at least one file 232. The request 210 can indicate a request to access the file 232 from the server 220 or a remote server 240. The request 210 can identify a single file 232 for access by the device 202. The request 210 can identify multiple files 232 for access by the device 202. The request 210 can identify the file 232 and file properties. For example, the request 210 can include a file type, a file identifier, a size of the file 232 and/or a location of file 232, such as but not limited to, a file database 230 storing the file 232 or a remote sever 240 storing the file 232. The request 210 can include an encryption code or decryption code. For example, the request 210 can be for a secure file 232 (e.g., encrypted file) and the request 210 can include an encryption code corresponding to the secure file 232. In some embodiments, the decryption code can be used to decrypt the requested file 232 and to provide access to the file 232 for the device 202.

In some embodiments, the request 210 can be generated in response to an interaction by a user of the device 202. For example, the server 220 can provide the user of the device 202 a menu or listing of files 232 through a client application 204 executing within the browser 206 on the device 202. The files 232 can be hosted or provided by the server 220 and/one or more remote servers 240 (e.g., remote from the server 220). The interaction can include a selection of at least one file 232 provided in the listing of the files 232. For example, a user of the device 202 can select (e.g., select a link corresponding to the file 232, select an icon corresponding to the file 232) at least one file 232 presented within the browser 206 of the device 202. In some embodiments, a user can enter a text phrase indicating a file 232 to request access to the respective file 232. For example, the text phrase can include a title of the file 232 or an identifier (e.g., alphanumerical identifier) corresponding to the file 232.

Responsive to the request 210, the server 220 can identify the requested file 232. The server 220 can determine what file database 230 stores the file 232. In some embodiments, the server 220 can determine if the file 232 is stored at a file database 230 at the server 220 or a file database 230 at a remote server 240. The server 220 can extract properties of the file 232 from the request 210 to identify the file 232. For example, the server 220 can extract properties such as, but not limited to, a file type, a file identifier, a size of the file 232 and/or a location of file 232 to identify the requested file 232. The server 220 can use the properties to identify the file database 230 storing, hosting or providing the file 232.

Referring now to operation (320), and in some embodiments, a bandwidth (B) for the channel 250 can be determined. For example, method 300 can include determining, by the server 220, a bandwidth of the channel 250 between the device and the server 220. The server 220 can determine a bandwidth of a single channel 250 between the device 202 and the server 220. The server 220 can determine the bandwidth of multiple channels 250 between the device 202 and the server 220. In some embodiments, the server 220 can determine a bandwidth of a channel 250 between the device 202 and a remote server 240. To determine the bandwidth available to the device 202, the server 220 can measure the properties of the channel 250, a virtual stream 224, or a download stream 226 to the device 202. In some embodiments, the server 220 can determine the amount of available bandwidth based on a portion of the file 232 provided to the client device during a predetermined length of time (e.g., sampling period, monitoring period). The predetermined length of time can range from 1 millisecond to 4 seconds (e.g., 2 seconds). The predetermined length of time can vary within or outside this range. The server 220 can measure a unit of memory or information transmitted to the device 202 during the predetermined time period to determine the bandwidth available to the device 202 during the channel 250. For example, the available bandwidth can correspond to a measured amount of data transmitted from the server 202 to the device 202 or from the server 240 to the device 202. The server 202 can measure or determine a bitrate of the channel 250 to transmit data between the server 220, server 240, and device 202. In some embodiments, the server 220 can measure the bytes per second of data (e.g., files, content) transmitted or provided to the device 202 to determine the bandwidth available to the device 202 during the channel 250.

In some embodiment, the server 220 can establish a download stream 226 to the device 202 responsive to the request 210 to determine the bandwidth. For example, the server 220 can initiate, responsive to the request 210, downloading of the file 232 for a predetermined length of time less than a total time to download the file 232. The server 220 can initiate the downloading of the file 232 through the download stream 226. The server 220 can establish the download stream 226 to the device 202 within or as part of the channel 250 established between the device 202 and the server 220. The server 220 can establish the download stream 226 to the device 202 as a separate channel 250 different from the initial channel 250 or as a second channel 250 between the device 202 and the server 220.

The initial or first download can correspond to a partial download of the file 232 to the device 202. For example, the initial or first download can provide a portion of the file 232 to the device 202 such that the server 202 can measure one or more properties of the file 232 or the channel 250 to the device 202. The properties may include, but not limited to, an amount of available bandwidth of the channel 250 and a size of the file 232. The portion of the file 232 (e.g., partial download) can be downloaded to the device 202 through the download stream 226. In some embodiments, the server 220 can download the file 232 for a predetermined length of time or predetermined time period to determine a bandwidth available to the device 202 through the channel 250 between the device 202 and the server 220. For example, the server 220 can initiate the download of the file 232 to the device 202 and measure the bandwidth used during the download to provide the portion of the file 232 to the device 202. The predetermined time period can be established by the server 220 or an administrator of the server 220. The predetermined time period can correspond to a time period to download one or more portions of the file 232, subsets of the file 232 or a full download of the file 232. The server 220 can measure the bytes of the file 232 downloaded to the device 202 through the download stream 226 during the predetermine time period (e.g., bytes/second) to determine the bandwidth available to the device 202 during the channel 250 or the download stream 226.

Referring now to operation (325), and in some embodiments, a size (S) of the file 232 can be determined. For example, method 300 can include determining, by the server 220, a size of the file 232 requested by the device 202. The server 220 can determine one or more properties of the file 232. The properties can include, but not limited to, a size of the file, a file type, access policies, permission policies, encryption data, and/or decryption data. In some embodiments, the server 220 can extract the properties of the file 232 from the request 210 for the file 232. The server 220 can extract the file properties from the respective file database 230 storing, hosting or providing the file 232. The server 220 can determine the size of the file 232. The size of the file can be expressed in a unit of measurement based on the byte. The server 220 can determine the number of bytes that correspond to the file 232.

Referring now to operation (330), and in some embodiments, a download time for the file 232 can be determined. For example, method 300 can include determining, by the server 220, a first time for the first mode of delivery based at least on the amount of available bandwidth and the size of the file 232. The first time for the first mode of delivery can correspond to a download time for the file 232. In embodiments, the server 220 can determine a download time for the file 232 using the bandwidth and the size of the file 232. The server 220 can determine an estimated download time corresponding to the time to download the file 232 to the device 202. The download time can correspond to a full download or partial download of the file 232 to the device 202. The server 220 can use the determined bandwidth and at least one property of the file 232 to determine the download time. For example, the server 220 can use the determined bandwidth and the size of the file 232. In some embodiments, the server 220 can divide the size of the file 232 by the determined bandwidth (e.g., size/bandwidth) to determine the download time. The download time can be expressed in various units of time (e.g., seconds, minutes). For example, the server 220 can determine the download time as a unit of seconds.

Referring now to operation (335), and in some embodiments, a virtualization time can be generated. For example, the server 220 can generate a virtualization time that corresponds to a time to provide a virtual version of one or more of the plurality of files 232 provided by the server 220. In embodiments, the virtualization time can correspond to a time to initiate or establish a virtual stream 224 to the device 202 to provide the virtual version of a requested file 232. The virtualization time can be established by the server 220 or an administrator of the server 220 (e.g., administrator configured parameter). The server 220 can establish the virtualization time based on previous virtual streams 224 established to the device 202, a different device 202, or a group of devices 202. The server 220 can establish the virtualization time based on properties of the server 220, channel 250 and/or network 260. For example, the server 220 can establish the virtualization time based in part on one or more processors of the server 220, a speed of the network 260, and/or a bandwidth of the channel 250. The server 220 can establish the virtualization time based on previous virtual streams 224 established to the device 202, a different device 202, or a group of devices 202. In some embodiments, the server 220 can establish the virtualization time based on a bandwidth requirement for a virtual stream between the device 202 and the server 220. For example, the bandwidth requirement can correspond to a bandwidth needed to provide a virtual version to the device 202 from the server 220 or a remote server 240. The server 220 can generate a unique or different virtualization time for each channel 250 established. In some embodiments, two or more channels 250 can have or be assigned the same virtualization time.

Referring now to operation (340), and in some embodiments, the download time can be compared to the virtualization time. For example, the server 220 can compare the first time to a second time to deliver the file 232 via the second mode of delivery. In embodiments, the server 220 can compare the download time (e.g., first time) to the virtualization time (e.g., second time). The server 220 can compare the virtualization time to the download time to determine if the virtualization time is greater than or less than the download time. In embodiments, the server 220 can select, based at least on the comparison, between the first mode of delivery (e.g., download) and the second mode of delivery (e.g., virtual stream 224).

Referring now to operation (345), and in some embodiments, if the download time is less than the virtualization time, a download stream 226 can be established to the device 202. For example, method 300 can include determining, by the server 220 and responsive to the comparison, a method of access to provide the file 232 to the device 202. The download stream 226 can include at least one connection or at least one session established between the device 202 and the server 220 or a remote server 240. The download stream 226 can correspond to a path connection or session established between the device 202 and the server 220 or a remote server 240 to transfer data (e.g., file 232) between any combination of the device 202, the server 220 and/or a remote server 240. The download stream 226 can include or correspond to a channel 250 between the device 202 and the server 220 or a remote server 240. The download stream 226 can be established within an existing channel 250 or as part of a new channel 250. The download stream 226 can be established independent of a channel 250 and thus, correspond to an independent connection to the device 202 from the server 220 or remote server 240.

The file server 220 can provide the file 232 to the device 202 through the determined method of access, here a download of the file 232. In some embodiments, the server 220 can compare the download time to the virtualization time and determine that the download time is less than the virtualization time. The server 220 can determine that it would be faster to download the file 232 to the device instead of providing a virtual version of the file 232 to the device 202. Responsive to the comparison, the server 220 can establish the download stream 226 to the device 202 to download the file 232 to the device 202. The server 220 can establish an initial bandwidth value for the download stream 226. In some embodiments, the server 220 can allocate a portion of the bandwidth of the channel 250 to the download stream 226. For example, the server 220 can allocate a percentage or a portion of the available bandwidth of the channel 250 to allocate bandwidth to the download stream 226. The server 220 can determine a bandwidth value to allocate to the download stream 226 that is a percentage or portion of the available bandwidth of the channel 250. In embodiments, the percentage or portion of the bandwidth value allocated to the download stream 226 can range from fifty percent of the available bandwidth of the channel 250 to ninety percent of the available bandwidth of the channel 250 to the download stream 226. In some embodiments, the server 220 can allocate the full bandwidth of the channel 250 to the download stream 226 or one hundred percent of the available bandwidth of the channel 250 to the download stream 226. The percentage or portion allocated to the download stream 226 can vary within or outside these ranges and/or percentages. The percentage or portion allocated to the download stream 226 can vary based in part on the available bandwidth of the channel 250 to the device 202.

Referring now to operation (350), and in some embodiments, a type of download can be determined. For example, the server 220 can determine to provide a full download of the file 232 to the device 202 or a partial download of the file 232 to the device 202. The type of download can correspond to a level of access to the file 232 for a user of the device 202, a speed of delivery of the file 232 to the device 202, and/or the bandwidth allocated to the download stream 226. In embodiments, the full download can correspond to the full file 232 and the full functionality of the requested file 232. Thus, the user of the device 202 can be provided full functionality (e.g., ability to edit file 232, modify properties of the file 232) to the requested file 232 when the full download is complete on the device 202. The partial download can correspond to portions of the requested file 232 or portions of the functionality of the requested file 232. For example, in response to receiving a partial download of a file 232, a user of the device 202 may be able to enter data into the only portions of the file 232 and may be prevented from interacting or editing other portions of the file 232. In some embodiments, the partial download can be provided to the device 202 through the channel 250 faster than a full download of the file 232. For example, a user of the device 202 may only need to preview or read the file 232 (e.g., no editing) and thus, may request 210 a partial download to receive the file 232 at device 202 at a faster speed than a full download had been requested. In some embodiments, based in part on the determined type of download, the server 220 can modify the bandwidth allocated to the download stream 226. For example, responsive to determining the request 210 is for a full download of the file 232, the server 220 can increase the bandwidth value allocated to the download stream 226. In embodiments, responsive to determining the request 210 is for a partial download of the file 232, the server 220 can decrease the bandwidth value allocated to the download stream 226.

In some embodiments, the type of download can be provided in the request 210 for the file 232 from the device 202. For example, a user of the device 202 can request a full download of the file 232 to the device 202. A user of the device 202 can request a partial download of the file 232 to the request 210. For example, the user of the device 202 may need to quickly preview the file 232 or portions of the file 232 and thus, can request to receive a partial download of the file 232 to the device 202. The server 220 can determine the type of download based in part on a type of functionality requested by the device 202. For example, the server 220 can determine if the device needs the full download or a partial download based in part on how the file 232 is to be interacted with or used when provided to the device 202.

In some embodiments, the server 220 can determine the type of download based in part on access policies or permission policies for the file 232, device 202, and/or a user of the device 202. For example, the server 220 can assign access policies for each of the plurality of files 232 stored in the file database 230. The access policies can correspond to a user of the device 202, a group of users, properties (e.g., security walls) of the device 202, and/or the type of file 232. In some embodiments, the requested file 232 can correspond to a shared file intended for a group of users. Thus, the server 220 can generate and assign access policies for the shared file identifying the group of users and different levels of access for users included in the group of users. Each of users of the intended group of users can be given the same level of access to the file 232. One or more users of the group of users can be given one or more different levels of access to the file 232 as compared to a level of access given to one or more different users of the group of users. In some embodiments, an access policy can indicate if a particular user can be provided a full download of the file 232 or a partial download of the file 232. An access policy can indicate if a particular device 202 the file is requested from can be provided a full download of the file 232 or a partial download of the file 232. Thus, the server 220 can identify one or more access policies for the requested file 232 and determine the type of download based in part on the one or more access policies for the requested file 232.

The server 220 can determine a bandwidth of the download stream 226 based in part on the type of download. For example, the server 220 can allocate or assign a first bandwidth value to the download stream 226 for a full download of the file 232 to the device 202. The server 220 can allocate or assign a second bandwidth value to the download stream 226 for a partial download of the file 232 to the device 202. The server 220 can determine to provide a greater bandwidth value to requests for full downloads as compared to partial downloads. The full download can correspond to a greater or larger amount of data to be transferred to the device 202 as compared to the partial download through channel 250. Therefore, the server 220 can determine a bandwidth or modify an existing bandwidth value allocated to a full download or partial download based in part on the amount of data for the full download or partial download, respectively. In embodiments, the server 220 can increase the bandwidth allocated to the download stream 226 responsive to determining the request 210 is for a full download of the file 232. The server 220 can decrease the bandwidth allocated to the download stream 226 responsive to the determining the request 210 is for a partial download of the file 232. In some embodiments, the first bandwidth value for the full download can be greater than the second bandwidth value for the partial download. In some embodiments, the server 220 can allocate or assign the same bandwidth value for a full download and a partial download of the file 232 to the device 202. Referring now to operation (355), and in some embodiments, the file 232 can be downloaded to the device 202. The server 220 can initiate downloading of the file 232 through the download stream 226. The file 232 can be fully downloaded to the device 202 through the download stream 226. The server 220 can be partially downloaded to the device 202 through the download stream 226.

Referring now to operation (360), and in some embodiments, if the download time is greater than or equal to the virtualization time, a virtual stream 224 can be established to the device 202. For example, method 300 can include determining, by the server 220 and responsive to the comparison, a method of access to provide the file 232 to the device 202. The file server 220 can provide the file 232 to the device 202 through the determined method of access, here a virtual version of the file 232. The virtual version of the file 232 can correspond to virtual access to a file 232 or virtualization of a file 232 for the device 202. In embodiments, the virtual version of the file 232 can correspond to a digitally replicated version of the file 232 or a version of the file 232 that has been virtualized. In some embodiments, the virtual version of the file 232 can have the same functionality as a downloaded version of the file 232. For example, the virtual version 232 can permit editing of the file 232, reading the file 232 and/or writing to the file 232.

In some embodiments, the virtual version of the file 232 can have different functionality as compared to a downloaded version of the file 232. For example, the virtual version of the file 232 may be limited to read only access to the file 232. The virtual version can be provided through a virtual stream 224. The virtual stream 224 can include a connection or a session between the device 202 and the server 220 or a remote server 240. The virtual version of the file 232 can correspond to a preview of the file 232. For example, the server 220 can provide the virtual version of the file 232 until the file 232 is downloaded to the device 202. In some embodiments, the server 220 can compare the download time to the virtualization time and determine that the virtualization time is less than the download time. The server 220 can determine that it would be faster to provide a virtual version of the file 232 to the device 202 instead of downloading the file 232 to the device 202. Responsive to the comparison, the server 220 can establish a virtual stream 224 to the device 202 to provide a virtual version of the file 232 to the device 202. In some embodiments, the server 220 can compare the download time to the virtualization time and determine that the virtualization time is the same as the download time. The server 220 can determine to provide a virtual version of the file 232 to the device 202 responsive to determining that the virtualization time is the same as the download time. In some embodiments, the server 220 can determine to download the file 232 to the device 202 responsive to determining that the virtualization time is the same as the download time. The server 220 can determine to provide a virtual version or download the file 232 based in part on the request 210. For example, if the request 210 included a request for a virtual version of the file 232, the server 220 can determine to provide a virtual version of the file 232 to the device 202. If the request 210 included a request for a download of the file 232, the server 220 can determine to download the file 232 to the device 202.

The server 220 can establish an initial bandwidth value for the virtual stream 224. In some embodiments, the server 220 can allocate a portion of the bandwidth of the channel 250 to the virtual stream 224. In some embodiments, the server 220 can allocate the full bandwidth of the channel 250 to the virtual stream 224. The initial bandwidth for the virtual stream 224 can be determined based in part on a bandwidth threshold 238. The bandwidth threshold 238 can indicate a quality of the respective stream (e.g., virtual stream 224, download stream 226). For example, a bandwidth value that exceeds the bandwidth threshold 238 or is in a range corresponding to the bandwidth threshold 238 can correspond to a greater or high quality of service for the respective device 202. The bandwidth threshold 238 can be generated by the server 220 or an administrator of the server 220 (e.g., configuration parameter). In some embodiments, the bandwidth threshold 238 can be determined based in part on the available bandwidth of the channel 250 or channels 250 to the device 202. In some embodiments, the bandwidth threshold 238 can be determined based in part on previous channels 250 or streams (e.g., virtual stream 224, download stream 226) established to the device 202. The bandwidth threshold 238 can be expressed in units of data. For example, in some embodiments, the bandwidth threshold 238 can correspond to a numerical value in terms of megabits per second (mbps) or a range of numerical values in terms of megabits per second (mbps). Thus, the server 220 can establish the initial bandwidth of the virtual stream 224 to be equal to or greater than the bandwidth threshold 238.

In some embodiments, the server 220 can provide the virtual version of the file 232 based in part on access policies or permission policies for the file 232, device 202, and/or a user of the device 202. For example, the server 220 can assign access policies for each of the plurality of files 232 stored in the file database 230. The access policies can correspond to a user of the device 202, a group of users, properties (e.g., security walls) of the device 202, and/or the type of file 232. For example, an access policy can indicate if a particular device 202 the file is requested from can be provided a full download of the file 232 or a partial download of the file 232. Thus, the server 220 can identify one or more access policies for the requested file 232 and determine properties and a level of access for the virtual stream 224 between the device 202 and the server 220. In some embodiments, the server 220 can establish the virtual stream 224 responsive to identifying and/or verifying properties of the user of the device 202 and/or the device 202 meets an access policy of the file 232. The virtual version can correspond to a full version of the file 232 having full functionality of the file 232. In some embodiments, the virtual version can correspond to a partial version of the file 232 having partial functionality of the file 232. The server 220 can initiate providing the virtual version of the file 232 to the device 202 through the virtual stream 224. The server 220 can determine the functionality of a file 232 to be provided to a device 202 based in part on the access policies. In some embodiments, the server 202 can identify the user of the device 202, the device 202, and/or the requested file 232 and identify access policies corresponding to the user of the device 202, the device 202, and/or the requested file 232. The server 220 can determine that the user of the device 202 is permitted or granted full access to the requested file 232 based in part on an access policy associated with the user of the device 202 and the server 220 can provide the file 232 with full functionality to the user of the device 202. The server 220 can determine that the device 202 is permitted or granted partial access to the requested file 232 based in part on an access policy associated with the device 202 and the server 220 can provide the file 232 with partial functionality to the user of the device 202 based on the access policies associated with the device 202. The server 220 can determine that the requested file 232 is restricted based in part on an access policy associated with the file 232 and the server 220 can provide the file 232 with partial functionality to the user of the device 202. The functionality or level of access for a file 232 can vary based in part on the access policies associated with the user of the device 202, the device 202, and/or the requested file 232.

Referring now to operation (365), and in some embodiments, a quality of the virtual stream 224 can be monitored. The server 220 can monitor one or more properties of the virtual stream 224 to the device 202. For example, the server 220 can monitor and measure a bandwidth of the virtual stream 224. In some embodiments, method 300 can include providing, by the server 220, the file 232 to the device 202 through a virtual stream 224 established in the channel 250 between the device 202 and the server 220 and determining, by the server 220, an available bandwidth of the channel 250 between the device 202 and the server 220. The available bandwidth can correspond to a difference between the session bandwidth and a virtual stream bandwidth of the virtual stream 224 between the device 202 and the server 220. The server 220 can measure the bandwidth of the virtual stream 224 between the device 202 and the server 220 or a remote server 240. The measured bandwidth can be compared to the bandwidth threshold 238 to determine if the virtual stream 224 has sufficient bandwidth to support providing a virtual version of the file 232 to the device 202. The measured bandwidth can be compared to the bandwidth threshold 238 to determine if the channel 250 has additional or surplus bandwidth, in addition to the bandwidth allocated to the virtual stream 224, to download the file 232 to the device 202 in parallel with providing the virtual version of the file 232 to the device 202. In some embodiments, the server 220 can monitor a bitrate of the virtual stream 224. For example, the server 220 can measure the bitrate of the virtual stream 224 between the device 202 and the server 220 or a remote server 240. The measured bitrate can be compared to a bitrate threshold to determine if the virtual stream 224 has sufficient bandwidth to support providing a virtual version of the file 232 to the device 202. The measured bitrate can be compared to the bitrate threshold 238 to determine if the channel 250 has additional or surplus capacity (e.g., additional bitrate), in addition to the bitrate allocated to the virtual stream 224, to download the file 232 to the device 202 in parallel with providing the virtual version of the file 232 to the device 202. In some embodiments, the server 220 can monitor an amount data transmitted through the virtual stream 224 to the device 202. For example, the server 202 can measure the amount of data transmitted through the virtual stream 224 to the device 202 using the size of the file 232 and bandwidth of the virtual stream 224. The server 202 can determine if the channel 250 has additional or surplus capacity based in part on the amount of data transmitted through the virtual stream 224. The server 220 can determine to download the file 232 to the device 202 in parallel with providing the virtual version of the file 232 to the device 202 responsive to determining that the channel 250 has additional or surplus capacity.

Referring now to operation (370), and in some embodiments, if a property of the virtual stream 224 is less than a threshold value 238, the establishment of a download stream can be prevented. The server 220 can compare the measured bandwidth to the bandwidth threshold 238. If the measured bandwidth of the virtual stream 224 is less than the bandwidth threshold 238 this can indicate that the quality of the virtual stream 224 is below an acceptable level and thus, a low level of quality. The measured bandwidth of the virtual stream 224 being less than the bandwidth threshold 238 can indicate that the channel 250 between the device 202 and the server 220 cannot handle another stream (e.g., download stream 226) because it cannot provide sufficient bandwidth to support another stream. For example, the measured bandwidth of the virtual stream 224 being less than the bandwidth threshold 238 can indicate that the available bandwidth to the device 202 may not be sufficient to support high quality streaming through the virtual stream 224. In some embodiments, responsive to the comparison, the server 220 can prevent a download stream 226 from being established between the device 202 and the server 220 and/or a remote server 240. The server 220, in some embodiments, can continually or up until a predetermined time period (e.g., during the session between the device 202 and the server 220) compare the measured bandwidth to the bandwidth threshold 238 to determine the quality of the virtual stream 224.

Referring now to operation (375), and in some embodiments, if a property of the virtual stream 224 is greater than or equal to the threshold value 238, a download stream 226 can be established to the device 202. For example, method 300 can include downloading, by the server 220 and based on the available bandwidth, the file 232 to the device 202 through a download stream 226 established within the channel 250 between the device 202 and the server 220. The server 220 can compare the measured bandwidth to the bandwidth threshold 238. If the measured bandwidth of the virtual stream 224 is greater than or equal to the bandwidth threshold 238 this can indicate that the quality of the virtual stream 224 is at or greater than an acceptable level and thus, a high level of quality. In some embodiments, the bandwidth threshold 238 can correspond to a range of values and the measured bandwidth can fall within the range of values and indicate a high level of quality. The measured bandwidth of the virtual stream 224 being equal to, greater than or within the bandwidth threshold 238 can indicate that the channel 250 between the device 202 and the server 220 has surplus available bandwidth and can handle another stream (e.g., download stream 226). For example, the measured bandwidth of the virtual stream 224 being equal to, greater than or within the bandwidth threshold 238 can indicate that the available bandwidth to the device 202 is sufficient to support high quality streaming through the virtual stream 224 and one or more additional streams to the device 202. The server 220 can, responsive to the comparison, establish a download stream 226 to the device 202. The file 232 can be downloaded to the device 202 through the download stream 226. The download stream 226 can be established to the device 202 while the virtual stream 224 is providing a virtual version to the device 202. The server 220 can establish the download stream 226 in parallel with the virtual stream 224 to the device 202. For example, method 300 can include downloading, by the server 220, the file 232 to the device 202 and providing, by the server 220 and during the download, the file 232 to the device through a virtual stream 224 established between the device 202 and the server 220. In some embodiments, the download stream 226 can be established within the same channel 250 as the virtual stream 224 to the device 202. In some embodiments, the download stream 226 can be established within a different channel 250 from the virtual stream 224 to the device 202. Thus, the server 220 can simultaneously provide the virtual stream 224 and the download stream 226 to the device 202.

In some embodiments, method 300 can include partitioning, by the server 220, the channel 250 into a download stream 226 and a virtual stream 224. The server 220 can allocate a bandwidth value to the download stream 226. The bandwidth value allocated to the download stream 226 can be based in part on the bandwidth of the virtual stream 224. For example, the server 220 can allocate a first bandwidth to the download stream 226 and a second bandwidth to the virtual stream 224. In some embodiments, the second bandwidth allocated to the virtual stream 224 can be same as the initial bandwidth allocated to the virtual stream 224 when the virtual stream 224 was established. The first bandwidth allocated to the download stream 226 can be a percentage of the second bandwidth allocated to the virtual stream 224 or consumed by the virtual stream 224. For example, the server 220 can determine to allocate a bandwidth value that corresponds to or is equivalent to a percentage of the second bandwidth allocated to the virtual stream 224 or consumed by the virtual stream 224. The percentage can vary based in part on the amount of the second bandwidth allocated to the virtual stream 224 or consumed by the virtual stream 224 and/or the available bandwidth (e.g., surplus bandwidth) within the channel 250 to the device 202. In some embodiments, the percentage can range from five percent to eighty percent. The percentage and the value of the bandwidth allocated to the download stream 226 can vary within or outside this range. In some embodiments, the initial bandwidth value allocated or provisioned to the download stream 226 when the download stream 226 is initiated in parallel (e.g., simultaneously) with the virtual stream 224 can be set by the filer server 220 or an administrator as a configuration parameter. For example, one or more download streams 226 can be allocated or assigned the same initial bandwidth. In some embodiments, the initial bandwidth value allocated or provisioned to the download stream 226 when the download stream 226 is initiated in parallel (e.g., simultaneously) with the virtual stream 224 can be different for each download stream 226 or generated uniquely by the filer server 220 or an administrator such that a first download stream 226 can have a different initial bandwidth from a second download stream 226.

The server 220 can allocate the surplus or remaining available bandwidth the download stream 226 not being used by the virtual stream 224. In some embodiments, the server 220 can determine the first bandwidth based in part on the size of the file 232 to be downloaded to the device 202. In some embodiments, the second bandwidth allocated to the virtual stream 224 can be different from the initial bandwidth allocated to the virtual stream 224 when the virtual stream 224 was established. The server 220 can provision or allocate bandwidth to the virtual stream 224 and the download stream 226 based in part on the available bandwidth through the channel 250 to the device 202. The server 220 can determine a first bandwidth for the download stream 226 and a second bandwidth for the virtual stream 224. The first bandwidth of the download stream 226 can be different (e.g., less than, greater than) the second bandwidth of the virtual stream 224. The first bandwidth of the download stream 226 can be the same as the second bandwidth of the virtual stream 224.

Referring now to operation (380), and in some embodiments, properties of the virtual stream 224 can be compared to a threshold value 238. For example, method 300 can include monitoring, by the server 220, a value of the second bandwidth of the virtual stream 224 and comparing, by the server 220, the value of the second bandwidth of the virtual stream 224 to a bandwidth threshold 238. Responsive to initiating the download stream 226 in parallel with the virtual stream 224, the server 220 can monitor the quality of the virtual stream 224 and/or download stream 226 to determine if the download stream 226 is degrading or otherwise negatively impacting the performance or quality of the virtual stream 224. The server 220 can monitor the impact the download stream 226 executing in parallel or simultaneous with the virtual stream 224 has on the virtual stream 224. In some embodiments, the server 220 can monitor the virtual stream 224 and the download stream 226 for a predetermined monitoring period. The monitoring period can vary and can be selected to be a portion of a time period in which the download stream 226 is executing in parallel or simultaneous with the virtual stream 224. The monitoring period can be set by the server 220 or an administrator of the server 220. In some embodiments, the server 220 can monitor the virtual stream 224 and the download stream 226 continuously while the download stream 226 is executing in parallel or simultaneous with the virtual stream 224.

The server 220 can monitor one or more properties of the virtual stream 224, the download stream 226 or both the virtual stream 224 and the download stream 226 to the device 202. For example, the server 220 can monitor and measure a bandwidth of the virtual stream 224, the download stream 226 or both the virtual stream 224 and the download stream 226. The measured bandwidth can be compared to the bandwidth threshold 238. The server 220 can compare the measured bandwidth of the virtual stream 224 to the bandwidth threshold 238. If the measured bandwidth of the virtual stream 224 is greater than, equal to or within the bandwidth threshold 238, this can indicate that the quality of the virtual stream 224 is at or above an acceptable level. The bandwidth of the virtual stream 224 being greater than, equal to or within the bandwidth threshold 238 can indicate the download stream 226 executing in parallel with the virtual stream 224 did not negatively impact the performance of the virtual stream 224.

Referring now to operation (385), and in some embodiments, if a property of the virtual stream 224 is greater than or equal to the threshold value 238, a bandwidth of the download stream 226 can be increased. For example, method 300 can include increasing, by the server 220 and responsive to the comparison, a value of the second bandwidth of the virtual stream 224. The server 220 can increase the bandwidth of the virtual stream 224, the download stream 226 or both the virtual stream 224 and the download stream 226. The file server can 220 can increase the bandwidth allocated to the download stream 226 by a predetermined bandwidth value. In some embodiments, the server 220 can increase the bandwidth allocated to the download stream 226 by ten percent. In some embodiments, the server 220 can increase the bandwidth allocated to the download stream 226 in a range from five percent to eighty percent. The increase in the bandwidth allocated to the download stream 226 can vary within or outside this range. The increase in the bandwidth allocated to the download stream 226 can be selected based at least in part on an available bandwidth to the device 202. In some embodiments, the server 220 can determine an available bandwidth or total bandwidth within the channel 250 between the device 202 and the server 220 or a remote server 240 to determine the amount to increase the bandwidth of the download stream 226 by. For example, the server 220 can increase the bandwidth allocated to the download stream 226 by a percentage of the available bandwidth or total bandwidth within the channel 250 between the device 202.

The file server can 220 can increase the bandwidth allocated to the virtual stream 224 by a predetermined bandwidth value. In some embodiments, the server 220 can increase the bandwidth allocated to the virtual stream 224 by ten percent. In some embodiments, the server 220 can increase the bandwidth allocated to the virtual stream 224 in a range from five percent to eighty percent. The increase in the bandwidth allocated to the virtual stream 224 can vary within or outside this range. The increase in the bandwidth allocated to the virtual stream 224 can be selected based at least in part on an available bandwidth to the device 202. In some embodiments, the server 220 can determine an available bandwidth or total bandwidth within the channel 250 between the device 202 and the server 220 or a remote server 240 to determine the amount to increase the bandwidth of the virtual stream 224 by. For example, the server 220 can increase the bandwidth allocated to the virtual stream 224 by a percentage of the available bandwidth or total bandwidth within the channel 250 between the device 202. The file server 220 can increase both the bandwidth allocated to the download stream 226 and the bandwidth allocated to the virtual stream 224. The file server 220 can increase the bandwidth allocated to the download stream 226 and the bandwidth allocated to the virtual stream 224 by the same amount. In some embodiments, the file server can 220 can increase the bandwidth allocated to the download stream 226 by a different amount from the increase in bandwidth allocated to the virtual stream 224.

Referring now to operation (390), and in some embodiments, if a property of the virtual stream 224 is less than a threshold value 238, a bandwidth of the download stream 226 can be decreased. For example, method 300 can include decreasing, by the server 220 and responsive to the comparison, a value of the second bandwidth of the virtual stream 224. The server 220 can compare the measured bandwidth of the virtual stream 224, download stream 226, or both the virtual stream 224 and the download stream 226 to the bandwidth threshold 238. If the measured bandwidth of the virtual stream 224 is less than the bandwidth threshold 238 this can indicate that the quality of the virtual stream 224 is below an acceptable level. For example, the quality of the virtual stream 224 can be degraded by initiating the download stream 226 in parallel with the virtual stream 224. Responsive to the comparison, the server 220 can decrease the bandwidth of the virtual stream 224, the download stream 226 or both the virtual stream 224 and the download stream 226.

The file server can 220 can decrease the bandwidth allocated to the download stream 226 by a predetermined bandwidth value. In some embodiments, the server 220 can decrease the bandwidth allocated to the download stream 226 by ten percent. In some embodiments, the server 220 can decrease the bandwidth allocated to the download stream 226 in a range from five percent to eighty percent. The decrease in the bandwidth allocated to the download stream 226 can vary within or outside this range. In some embodiments, the server 220 can determine an available bandwidth or total bandwidth within the channel 250 between the device 202 and the server 220 or a remote server 240 to determine the amount to decrease the bandwidth of the download stream 226 by. For example, the server 220 can decrease the bandwidth allocated to the download stream 226 by a percentage of the available bandwidth or total bandwidth within the channel 250 between the device 202. The file server 220 can decrease the bandwidth allocated to the virtual stream 224 by a predetermined bandwidth value. In some embodiments, the server 220 can decrease the bandwidth allocated to the virtual stream 224 by ten percent. In some embodiments, the server 220 can decrease the bandwidth allocated to the virtual stream 224 in a range from five percent to eighty percent. The decrease in the bandwidth allocated to the virtual stream 224 can vary within or outside this range. In some embodiments, the server 220 can determine an available bandwidth or total bandwidth within the channel 250 between the device 202 and the server 220 or a remote server 240 to determine the amount to decrease the bandwidth of the virtual stream 224 by. For example, the server 220 can decrease the bandwidth allocated to the virtual stream 224 by a percentage of the available bandwidth or total bandwidth within the channel 250 between the device 202.

The file server can decrease both the bandwidth allocated to the download stream 226 and the bandwidth allocated to the virtual stream 224. For example, the file server 220 can decrease the bandwidth allocated to the download stream 226 and the bandwidth allocated to the virtual stream 224 by the same amount. In some embodiments, the file server 220 can decrease the bandwidth allocated to the download stream 226 by a different amount from the increase in bandwidth allocated to the virtual stream 224.

The server 220 can continually check and monitor the quality of the virtual stream 224, the download stream 226 or both the virtual stream 224 and the download stream 226. The server 220 can dynamically modify the bandwidth allocated to the virtual stream 224, the download stream 226 or both the virtual stream 224 and the download stream 226. For example, the server 220 can dynamically increase the bandwidth allocated to the virtual stream 224, the download stream 226 or both the virtual stream 224 and the download stream 226 responsive to at least one stream being greater than, equal to or within the bandwidth threshold 238. The server 220 can dynamically decrease the bandwidth allocated to the virtual stream 224, the download stream 226 or both the virtual stream 224 and the download stream 226 responsive to at least one stream being less than the bandwidth threshold 238. The server 220 can determine a method of access to provide a file 232 based in part on the measured bandwidth values and size of the requested file 232. The server 220 can select between a plurality of method of access, including but not limited to, full download of the file 232, partial download of the file 232, or virtual version of the file 232.

Various elements, which are described herein in the context of one or more embodiments, may be provided separately or in any suitable subcombination. For example, the processes described herein may be implemented in hardware, software, or a combination thereof. Further, the processes described herein are not limited to the specific embodiments described. For example, the processes described herein are not limited to the specific processing order described herein and, rather, process blocks may be re-ordered, combined, removed, or performed in parallel or in serial, as necessary, to achieve the results set forth herein.

It will be further understood that various changes in the details, materials, and arrangements of the parts that have been described and illustrated herein may be made by those skilled in the art without departing from the scope of the following claims.

The invention claimed is:

1. A method comprising:
receiving, by a server, a request to download a file, the server configured to deliver the file to a client device via a plurality of modes of delivery;
determining, by the server, a first mode of delivery and a second mode of delivery in which to transfer the file using a channel between the server and the client device, the first mode of delivery including download of the file onto the client device and the second mode of delivery including virtualization of the file by streaming the file between the server and the client device;
initiating, by the server, a first download of a portion of the file for a length of time less than a total time to download the file to enable determination of a size of the file and an amount of available bandwidth of the channel;
selecting, by the server using the size of the file and the amount of available bandwidth, one of the first mode of delivery or the second mode of delivery; and
providing, by the server responsive to the request, the file via one of the selected first mode of delivery or selected second mode of delivery, wherein one of the selected first mode of delivery or selected second mode of delivery provides access to the file for the client device in a first time period that is less than a second time period for the other of the selected first mode of delivery or selected second mode of delivery.

2. The method of claim 1, further comprising:
determining, by the server from the first download of the portion of the file for the length of time, the total time to download the file for a full download of the file to the client device.

3. The method of claim 1, further comprising determining, by the server, a time to deliver the file via the second mode or delivery using a virtual stream, the time to deliver the file via the second mode of delivery based on a bandwidth requirement for the virtual stream between the client device and the server and through the channel.

4. The method of claim 1, further comprising:
initiating, by the server responsive to the selection, a second download of the file to the client device, the second download corresponding to a full download of the file to the client device; and
providing, by the server and in parallel with the second download of the file, the file to the client device using the second mode of delivery via a virtual stream established between the server and the client device.

5. The method of claim 1, further comprising:
initiating, by the server, the second mode of delivery of the plurality of modes of delivery to deliver the file to the client device via a virtual stream between the client device and the server and through the channel for a second length of time; and
determining, by the server, the amount of available bandwidth responsive to the initiating the virtual stream to the client device based on a second portion of the file provided to the client device during the second length of time.

6. The method of claim 5, further comprising:
downloading, by the server and based on the amount of available bandwidth, the file to the client device using the first mode of delivery through a second download of the file to the client device, the second download corresponding to a full download of the file to the client device.

7. The method of claim 1, further comprising:
monitoring, by the server, a bandwidth value allocated for the second mode of delivery via a virtual stream between the server and the client device;
comparing, by the server, the bandwidth value allocated for the second mode of delivery via the virtual stream to a bandwidth threshold; and
modifying, by the server and responsive to the comparison, the bandwidth value allocated for the second mode of delivery via the virtual stream.

8. The method of claim 7, further comprising:
increasing, by the server and responsive to the comparison, the bandwidth value allocated for the second mode of delivery via the virtual stream.

9. The method of claim 7, further comprising:
decreasing, by the server and responsive to the comparison, the bandwidth value allocated for the second mode of delivery via the virtual stream.

10. The method of claim 1, wherein the first mode of delivery includes at least one of: full download of the file or partial download of the file.

11. A system for selecting between modes for delivering a file, the system comprising:
a server comprising one or more processors, coupled to memory, and the server configured to:
receive a request to download a file, the server configured to deliver the file to a client device via a plurality of modes of delivery;
determine a first mode of delivery and a second mode of delivery in which to transfer the file using a channel between the server and the client device, the first mode of delivery including download of the file onto the client device and the second mode of delivery including virtualization of the file by streaming the file between the server and the client device;

initiate a first download of a portion of the file for a length of time less than a total time to download the file to enable determination of a size of the file and an amount of available bandwidth of the channel;

select, using the size of the file and the amount of available bandwidth, one of the first mode of delivery or the second mode of delivery; and provide, responsive to the request, the file via one of the selected first mode of delivery or selected second mode of delivery, wherein one of the selected first mode of delivery or selected second mode of delivery provides access to the file for the client device in a first time period that is less than a second time period for the other of the selected first mode of delivery or selected second mode of delivery.

12. The system of claim 11, wherein the server is further configured to:
determine, from the first download of the portion of the file for the length of time, the total time to download the file for a full download of the file to the client device.

13. The system of claim 11, wherein the server is further configured to:
determine a time to deliver the file via the second mode of delivery using a virtual stream, the time to deliver the file via the second mode of delivery based on a bandwidth requirement for the virtual stream between the client device and the server and through the channel.

14. The system of claim 11, wherein the server is further configured to:
initiate, responsive to the selection, a second download of the file to the client device, the second download corresponding to a full download of the file to the client device; and
provide, in parallel with the second download of the file, the file to the client device using the second mode of delivery via a virtual stream established between the server and the client device.

15. The system of claim 11, wherein the server is further configured to:
initiate the second mode of delivery of the plurality of modes of delivery to deliver the file to the client device via a virtual stream between the client device and the server and through the channel for a second length of time; and
determine the amount of available bandwidth responsive to the initiating the virtual stream to the client device based on a portion of the file provided to the client device during the second length of time.

16. The system of claim 15, wherein the server is further configured to:
download, based on the amount of available bandwidth, the file to the client device using the first mode of delivery through a second download of the file to the client device, the second download corresponding to a full download of the file to the client device.

17. The system of claim 11, wherein the server is further configured to:
monitor a bandwidth value allocated for the second mode of delivery via a virtual stream between the server and the client device;
compare the bandwidth value allocated for the second mode of delivery via the virtual stream to a bandwidth threshold; and
modify, responsive to the comparison, a size of the bandwidth value allocated for the second mode of delivery via the virtual stream.

18. A non-transitory computer-readable medium, comprising instructions that, when executed by one or more processors, cause the one or more processors to:
receive a request to download a file, a server configured to deliver the file to a client device via a plurality of modes of delivery;
determine a first mode of delivery and a second mode of delivery in which to transfer the file using a channel between the server and the client device, the first mode of delivery including download of the file onto the client device and the second mode of delivery including virtualization of the file by streaming the file between the server and the client device;
initiate a first download of a portion of the file for a length of time less than a total time to download the file to enable determination of a size of the file and an amount of available bandwidth of the channel;
select, using the size of the file and the amount of available bandwidth, one of the first mode of delivery or the second mode of delivery; and
provide, responsive to the request, the file via one of the selected first mode of delivery or selected second mode of delivery, wherein one of the selected first mode of delivery or selected second mode of delivery provides access to the file for the client device in a first time period that is less than a second time period for the other of the selected first mode of delivery or selected second mode of delivery.

19. The non-transitory computer-readable medium of claim 18, further comprising instructions that cause the one or more processors to:
determine, from the first download of the portion of the file for the length of time, the total time to download the file for a full download of the file to the client device.

20. The non-transitory computer-readable medium of claim 18, further comprising instructions that cause the one or more processors to:
monitor a bandwidth value allocated for the second mode of delivery via a virtual stream between the server and the client device;
compare the bandwidth value allocated for the second mode of delivery via the virtual stream to a bandwidth threshold; and
modify, responsive to the comparison, a size of the bandwidth value allocated for the second mode of delivery via the virtual stream.

* * * * *